United States Patent
Carlson et al.

(10) Patent No.: US 6,950,228 B2
(45) Date of Patent: Sep. 27, 2005

(54) ELECTRO-OPTIC REFLECTIVE MODULATORS

(75) Inventors: Steven Allen Carlson, Allston, MA (US); Arthur Wagner Berger, Cambridge, MA (US)

(73) Assignee: Optodot Corporation, Allston, MA (US)

( * ) Notice: Subject to any disclaimer, the term of this patent is extended or adjusted under 35 U.S.C. 154(b) by 0 days.

(21) Appl. No.: 10/785,370

(22) Filed: Feb. 23, 2004

(65) Prior Publication Data

US 2004/0165245 A1 Aug. 26, 2004

Related U.S. Application Data

(63) Continuation-in-part of application No. 10/024,060, filed on Dec. 18, 2001, now Pat. No. 6,724,512, which is a continuation-in-part of application No. 09/852,392, filed on May 9, 2001, now Pat. No. 6,583,916, which is a continuation-in-part of application No. 09/706,166, filed on Nov. 3, 2000, now Pat. No. 6,381,059.
(60) Provisional application No. 60/163,349, filed on Nov. 3, 1999.

(51) Int. Cl.[7] .............................. G02F 1/29; G02F 1/03; G02F 1/00; G02B 6/26

(52) U.S. Cl. ........................ 359/320; 359/252; 359/321; 385/18

(58) Field of Search ................................. 359/244, 245, 359/252–254, 290, 294, 296, 320–322; 385/1–3, 14–16, 18, 39, 40; 398/51, 54–56, 183; 252/582, 587

(56) References Cited

U.S. PATENT DOCUMENTS 5,037,169 A * 8/1991 Chun .......................... 385/16

* cited by examiner

*Primary Examiner*—Georgia Epps
*Assistant Examiner*—Jack Dinh
(74) *Attorney, Agent, or Firm*—Steven A. Carlson

(57) ABSTRACT

Provided is an electro-optic reflective modulator comprising a reflective active material, preferably comprising a reflective organic free radical compound, that reflects a wavelength in a highly reflective state and is reversibly switched to a transparent and low reflectivity state at the wavelength by the application of an electric current. Preferably, the electro-reflective optical modulator is solid state with no moving parts such that the active material does not move when reversibly switched between the high and low reflective states. Also provided are methods of modulating an optical signal utilizing such electro-optic reflective modulators.

36 Claims, 6 Drawing Sheets

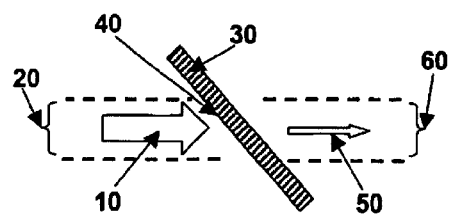
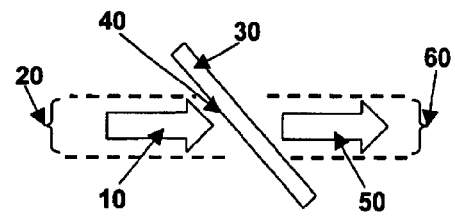
FIG. 8A  FIG. 8B
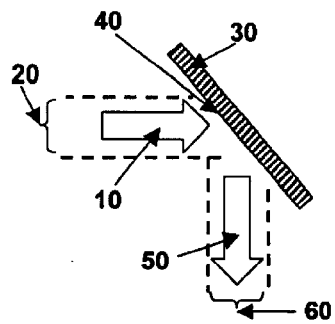
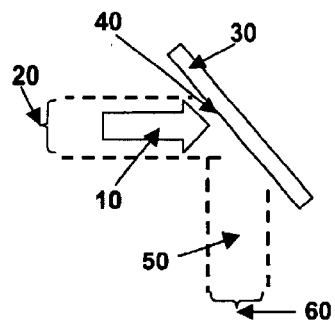
FIG. 9A  FIG. 9B
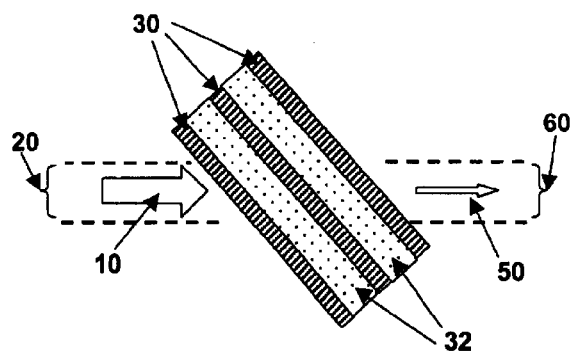
FIG. 10

ELECTRO-OPTIC REFLECTIVE MODULATORS

RELATED APPLICATIONS

This application relates to U.S. Patent Application titled "Electro-Optic Modulators," U.S. Ser. No. 10/786,579, filed on even date herewith, and is a continuation-in-part of U.S. patent application Ser. No. 10/024,060, filed Dec. 18, 2001 now U.S. Pat. No. 6,724,512, which is a continuation-in-part of U.S. patent application Ser. No. 09/852,392, filed May 9, 2001, now U.S. Pat. No. 6,583,916, which is a continuation-in-part of U.S. patent application Ser. No. 09/706,166, filed Nov. 3, 2000, now U.S. Pat. No. 6,381,059, which claims priority to U.S. Provisional Patent Application No. 60/163,349, filed Nov. 3, 1999, and which relates to U.S. patent application Ser. No. 09/705,118, filed Nov. 2, 2000, now U.S. Pat. No. 6,589,451, all to the common assignee, the disclosures of which related applications are fully incorporated herein in their entirety for all purposes.

FIELD OF THE INVENTION

The present invention relates generally to the field of optical shutters and switches, and particularly, pertains to optical shutters and switches which operate in the near-infrared and/or visible wavelength regions. More specifically, this invention pertains to optical shutters, switches, and modulators comprising a reversible non-reflective-to-reflective optical shutter. This invention also pertains to methods of modulating an optical signal by utilizing the optical shutters, switches, and modulators of this invention.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optic systems rapidly increases due to the growing demand from Internet usage and other communications, improved all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in improved all-optical switches.

An all-optical switch provides switching of an optical signal from one input path to a selected one of a plurality of different output paths without any intermediate conversion of the optical signal to an electrical signal. This is typically accomplished by applying an electrical signal to a switchable element to cause the optical signal to be selectively switched. These electro-optic switches are responsive to the electrical signal to selectively switch the light of the optical signal from the input path to the selected one of the output paths.

A variety of approaches are known for making all-optical or hybrid optical switches, such as, for example, described in U.S. Pat. No. 5,905,587 to Maeno, et al.; U.S. Pat. No. 5,923,798 to Aksyuk, et al.; U.S. Pat. No. 5,970,185 to Baker, et al.; U.S. Pat. No. 5,841,912 to Mueller-Fiedler, et al.; U.S. Pat. No. 5,091,984 to Kobayashi, et al.; U.S. Pat. No. 5,406,407 to Wolff; U.S. Pat. No. 5,740,287 to Scalora, et al.; U.S. Pat. No. 5,960,133 to Tomlinson; U.S. Pat. No. 5,539,100 to Wasielewski et al.; and U.S. Pat. No. 5,943,453 to Hodgson.

A variety of approaches are also known for making electro-optic modulators; as illustrated, for example, by U.S. Pat. No. 5,528,414 to Oakley, U.S. Pat. No. 5,550,670 to Zielinski, et al.; U.S. Pat. No. 5,566,257 to Jaeger, et al.; U.S. Pat. No. 5,825,525 to Harwit; 6,172,791 to Gill, et al.; U.S. Pat. No. 6,204,951 to Coward, et al.; and U.S. Pat. No. 6,222,666 to Moulin.

The need for improved optical switches is increased by the use of wavelength multiplexing which converts the optical signal in the optical fiber into, for example, 16 signals at 16 different wavelengths in a near-infrared range of about 1540 to 1560 nm, as, for example, described in *Bell Labs Technical Journal*, January–March 1999, pages 207 to 229, and references therein, by Giles et al.; and in U.S. Pat. No. 5,959,749 to Danagher et al. The primary function of the optical switch is to add and/or drop optical signals from the multiple wavelengths traveling through the optical fiber. It would be highly desirable to have arrays of optical switches to handle the optical signals from multiple wavelengths per optical fiber and from multiple optical fibers, such as up to 100×100 or greater optical switch arrays. Also, it would be highly desirable if the response time for the optical switch is ultrafast, such as 1 nanosecond or less.

As the speed of data communications over fiber optic systems increases beyond 2.5 gigabits per second (Gbps) to 10 Gbps and higher, the modulation of the laser signal sources to produce the optical signal for transmission typically changes from direct "on-off" modulation of the laser to an external or integrated "hybrid" modulator for the laser in order to provide the required quality for the optical signal. These optical modulators include interferometric phase modulators, such as lithium niobate and electro-optic polymer modulators, and electro-absorption modulators, such as indium phosphide (InP) modulators, as known in the art of electro-optic modulators.

It would be advantageous if an all-optical switching system were available which avoided the complexity and cost of optical-electrical-optical (so-called O-E-O) switching systems, conventional electro-optic and other all-optical switching systems while increasing the speed of the optical signal switching times from the millisecond range to the nanosecond or picosecond ranges. It would be further advantageous if an all-optical switching system were available which could be utilized for ultrafast optical modulators in fiber optic and other optical transmission systems to provide greater optical signal quality, smaller sizes capable of monolithic integration with the lasers and other optical components, lower energy requirements, higher signal transmission speeds, and lower costs.

SUMMARY OF THE INVENTION

One aspect of this invention pertains to optical shutters and modulators having a first state of a low reflectivity at a range of wavelengths and a second state of a high reflectivity at the range of wavelengths, wherein the optical shutter in the second state comprises an organic free radical compound. In one embodiment, the first state is transparent at the range of wavelengths. In one embodiment, the second state is opaque at the range of wavelengths. In one embodiment, the second state is transparent at the range of wavelengths.

Because the switching speeds of the optical shutters of this present invention can be ultrafast in the range of 1 nanosecond or less and the switching can be induced by the application of an electric current or field, the optical shutters of this invention are particularly suited for optical modulators. In one embodiment of the optical modulators of this invention, where the reflectivity of the optical shutter is electrically turned "on-and-off", an unique electro-reflective optical modulator is provided that has the useful feature of being solid state and not requiring any moving parts when switching or modulating between non-reflective and reflective states.

Another aspect of this invention pertains to an electro-reflective optical modulator having a first state of transparency and of low reflectivity at a wavelength and a second state of high reflectivity at the wavelength, wherein the optical modulator comprises a reflective organic material that reflects the wavelength in the second state and the optical modulator is reversibly switched between the first and second states by the application of an electric current. Another aspect of the present invention pertains to an electro-optic modulator comprising an active material having a first state of transparency and of low reflectivity at one or more wavelengths and a second state of high reflectivity at the one or more wavelengths, wherein the active material reversibly switches between the first and second states.

Still another aspect of the present invention pertains to an optical modulator for modulating an optical signal at a wavelength in an input optical path between a first state of transmitting the optical signal into an output optical path and a second state of not transmitting the optical signal into the output optical path, wherein the optical modulator comprises an active modulating material, which modulating material comprises an organic free radical compound in at least one of the first and second states. In one embodiment, the optical modulator is reversibly switched between the first and second states by the application of an electric current.

In a preferred embodiment of the optical modulators of the present invention, the reflective organic material does not absorb at the wavelength. In one embodiment, the reflective organic material is a reflective organic free radical compound, preferably a salt of an organic free radical cation, more preferably a salt of a non-polymeric organic free radical cation, and most preferably a salt of an aminium radical cation. In one embodiment, the optical modulator is reversibly switched between the first and second states by the injection and removal of electrons. In one embodiment, the optical modulator is solid state and has no moving parts. In one embodiment, the reflective organic material is switched to a non-reflective organic material in the first state. In one embodiment, the optical modulator comprises a reflective stack of two or more reflective layers comprising the reflective organic material and of one or more non-reflective layers interposed between each of the two or more reflective layers. In one embodiment, the wavelength is an infrared wavelength, preferably a wavelength from 1250 nm to 1750 mn.

Still another aspect of this invention pertains to a method of modulating an optical signal at a wavelength, wherein the method comprises the steps of: (a) providing an input optical path; (b) providing an output optical path; (c) interposing an electro-reflective optical modulator of the present invention, as described herein, between the input and output optical paths, wherein the optical modulator has a first state of transparency and of low reflectivity at the wavelength and a second state of high reflectivity at the wavelength, and wherein the optical modulator comprises a reflective organic material that reflects the wavelength in the second state and the optical modulator is reversibly switched between the first and second states by the application of an electric current; (d) providing an optical signal in the input optical path; and (e) applying an electric current to reversibly switch the optical modulator between the first and second states to modulate the optical signal in the output optical path.

Another aspect of the present invention pertains to a method of modulating an optical signal at a wavelength, wherein the method comprises the steps of: (a) providing an input optical path; (b) providing an output optical path: (c) interposing an optical modulator of this invention, as described herein, between the input and output optical paths, wherein the optical modulator has a first state of transmitting the optical signal and a second state of not transmitting the optical signal, and wherein the optical modulator comprises an active modulating material that comprises an organic free radical compound in at least one of the first and second states; (d) providing an optical signal in the input optical path; and (e) reversibly switching the optical modulator between the first and second states to modulate the optical signal in the output optical path. In one embodiment, the optical modulator is reversibly switched between the first and second states by the application of an electric current.

As will be appreciated by one of skill in the art, features of one aspect or embodiment of the invention are also applicable to other aspects or embodiments of the invention.

BRIEF DESCRIPTION OF THE DRAWINGS

For the purpose of illustrating the invention, particular arrangements and methodologies are shown in the drawings. It should be understood, however, that the invention is not limited to the precise arrangements shown or to the methodologies of the detailed description.

FIG. 8A shows a top down view of one embodiment of the optical modulators of the present invention with the optical modulator in the reflective state and positioned such that a reflective surface of the optical modulator is at a 45° angle with respect to the path of the optical signal.

FIG. 8B shows a top down view of one embodiment of the optical modulators of the present invention with the optical modulator in the transparent state and positioned such that a surface of the optical modulator is at a 45° angle with respect to the path of the optical signal.

FIG. 9A shows a top down view of another embodiment of the optical modulators of the present invention with the optical modulator in the reflective state and positioned such that a reflective surface of the optical modulator is at a 45° angle with respect to the path of the optical signal.

FIG. 9B shows a top down view of another embodiment of the optical modulators of the present invention with the optical modulator in the transparent state and positioned such that a surface of the optical modulator is at a 45° angle with respect to the path of the optical signal.

FIG. 10 shows a top down view of another embodiment of the optical modulators of the present invention comprising a reflective stack of interleaved layers of (1) active material and (2) static, non-reflective, and transparent material.

DETAILED DESCRIPTION OF THE INVENTION

Figure 1:
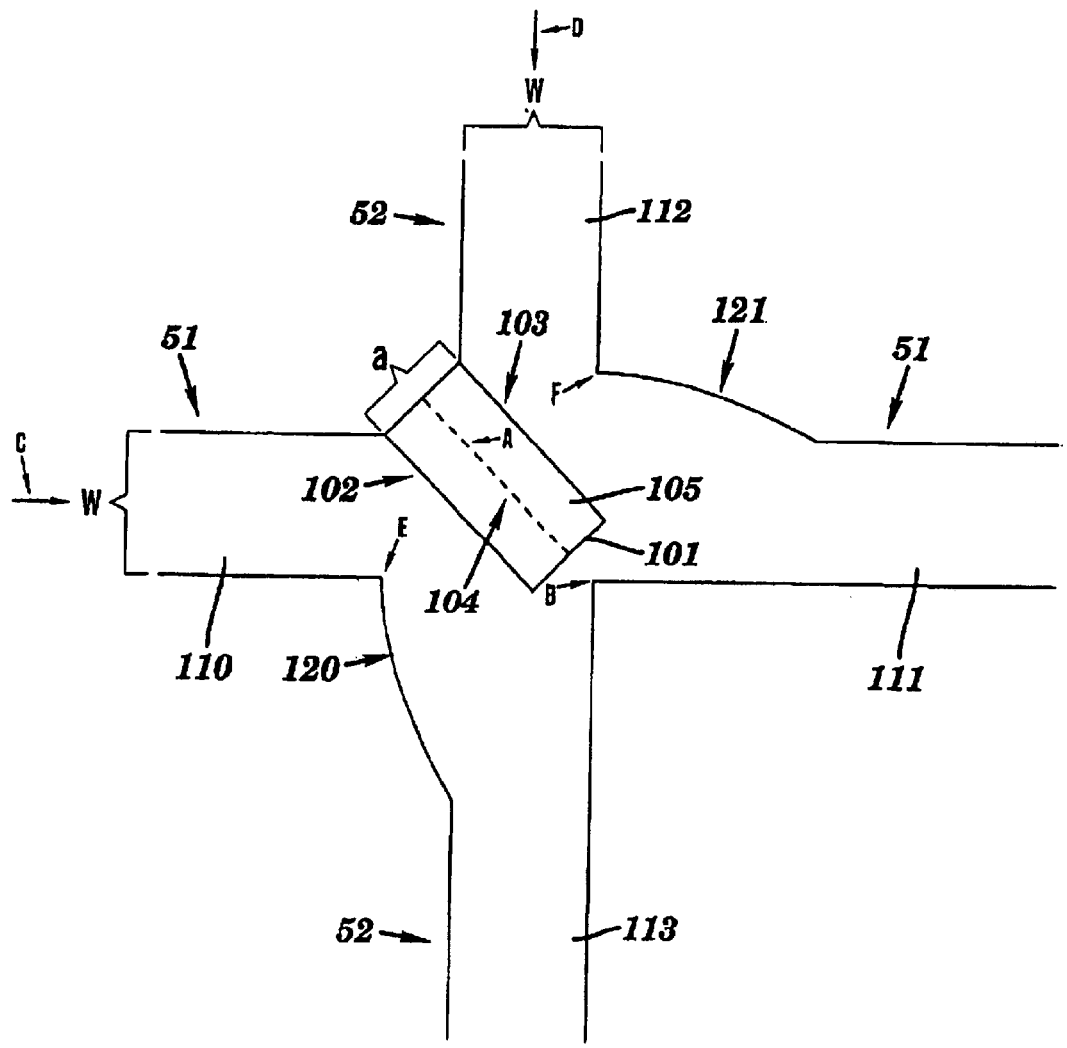
FIG. 1 shows a top down view of one embodiment of the optical shutters of the present invention and utilizing waveguides to transmit the optical signals with tapered waveguides on the output optical paths.

The optical shutters, switch devices, and modulators of the present invention provide dynamic and flexible response to the incident optical signals, and are particularly useful in modulating the optical signal for high speed optical and data communications.

Organic Free Radical Compounds

The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the optical shutters, switch devices, and modulators of the present invention include neutral organic free radicals, salts of organic free radical cations, and salts of organic free radical anions. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. Similarly, the terms "organic free radical anion," "organic radical anion," and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the optical shutters, switch devices, and modulators of this invention include, but are not limited to, salts of aminium radical cations, such as, for example, tris(p-diethylaminophenyl)aminium hexafluoroantimonate, which is commercially available as IR-99, a trademark for a dye available from GPT Glendale, Attleboro Falls, MA. An equivalent chemical name for IR-99, used interchangeably herein, is the hexafluoroantimonate salt of N,N-dibutyl-N', N'-bis[4-(diethylamino)phenyl]-1,4-benzenediamine radical cation. IR-99 is known to be a stable material that may exist in a layer of material, such as in a polymeric coating, under normal room conditions for an extended period of time. Other suitable salts of aminium radical cations with a tris(p-dialkylaminophenyl)aminium salt molecular structure include IR-126 and IR-165, which are trademarks for dyes available from GPT Glendale, Attleboro Falls, Mass. These two dyes are likewise known to be stable in the dry powder form and in a layer of material, such as in a polymer-containing coating, under ambient room conditions for extended periods of time, such as for many years.

IR-126, which is the hexafluoroantimonate salt of tetrakis [4-(dibutylamino)phenyl]-1,4benzenediamine radical cation, is particularly preferred for use in reversible transparent-to-opaque imaging layers in the optical shutters, switch devices, and modulators of this invention because of its very intense and relatively flat absorption across the 1400 to 1700 nm wavelength region typically utilized for optical Internet fiber optic communication channels and because of its one-electron reduction to a very transparent neutral non-free radical compound which has no significant absorption above 500 nm. Also, IR-126 may undergo a one-electron oxidation to IR-165, which has a much lower absorption in the 1500 to 1700 nm wavelength region.

A pure dye layer of IR-165 on a polyethylene terephthalate (PET) plastic film was found to be reflective in the infrared, including over the 1400 to 1700 nm wavelength region. IR-99 was found to have reflectance across the 1250 to 3000 nm wavelength region even though the IR-99 layer showed no significant absorption at wavelengths of 1250 nm and higher. Thus, certain organic free radical compounds, such as IR-99 and IR-165 aminium salts, show reflectance in the visible and/or infrared wavelength regions and, due to their reversible one-electron and two-electron reactions to form non-reflective products, are suitable for use in the reversible non-reflective-to-reflective switching of the optical shutters, switch devices, and modulators of this invention. Preferred are organic free radical compounds, such as IR-99, which are reflective and transmissive, but not absorptive, in the wavelength region of interest for the particular application, such as, for example, 1250 to 1700 nm for optical Internet applications.

Examples of suitable salts of organic free radical anions for the optical shutters, switch devices, and modulators of the present invention include, but are not limited to, salts of anthrasemiquinone radical anions, such as, for example, described in *Photochemistry and Photobiology*, Vol. 17, pages 123–131 (1973) by Carlson and Hercules.

For example, under reductive conditions, a light tan layer comprising IR-165 upon laser exposure at 1065 nm may undergo photo-induced electron transfer reactions which compete efficiently with the ultrafast photothermal processes of IR-165 to produce a reduced product having a change in absorption in both the visible and the near-infrared wavelength regions. The reduced product of IR-165 may be an intense yellow-green compound from an one-electron photo-induced electron transfer reaction, particularly when the layer of IR-165 comprises a polymer which does not promote oxidation or protonation of IR-165 upon exposure to radiation. The yellow-green, reduced product of IR-165 has new intense absorption peaks at 950 nm and 1480 nm, in comparison to the absorption of IR-165. One of the yellow-green, reduced products of IR-165 is IR-126, which is an one-electron reduction product of IR-165. Depending on the other materials present in the layer, these yellow-green reduced compounds may be transient compounds and may thermally revert to the starting IR-165 material at various speeds from less than 0.1 milliseconds to many seconds. A photo-induced reaction may be utilized to accelerate the reversion back to the starting IR-165 material.

Also, for example, layers comprising salts of anthrasemiquinone radical anions, including the many possible substituted and other derivatives of the anthrasemiquinone radical anion, may undergo photo-induced electron transfer reactions which occur very rapidly and compete efficiently with the photothermal processes of these radical anions, to produce a reduced product having a change in absorption in both the visible and the near-infrared wavelength regions. This change in absorption typically includes a loss in absorption in the near-infrared wavelength region due to the conversion of the radical anion to a non-free radical compound, such as, for example, to a dianion.

Optical Shutters, Switch Devices, and Modulators

One aspect of the present invention pertains to an optical shutter comprising an organic free radical compound in which the free radical compound forms an oxidized or a reduced product having a change in absorption and/or reflectivity in a visible and/or a near-infrared wavelength region as a result of a photo-induced and/or electric current-induced reaction of the free radical compound, preferably an electron transfer reaction of the free radical compound.

Another aspect of the present invention relates to an optical shutter having a first state of a low reflectivity at a range of wavelengths and a second state of a high reflectivity at the range of wavelengths, which optical shutter comprises an organic free radical compound in at least one of the first and second states; and wherein the optical shutter is reversibly imageable between the first and second states.

Where the optical shutters of this invention are electrically switched between the first and second states of low and high reflectivity, respectively, electro-optic reflective modulators comprising the optical shutters may be obtained, as described further herein.

Still another aspect of this invention pertains to an optical shutter having a first state of a low reflectivity at a range of wavelengths and a second state of a high reflectivity at the range of wavelengths, wherein the optical shutter in the second state comprises an organic free radical compound. In one embodiment, the first state is transparent at the range of wavelengths. In one embodiment, the second state is opaque at the range of wavelengths. In one embodiment, the second state is transparent at the range of wavelengths.

In one embodiment of the optical shutter of this invention, the optical shutter comprises a first surface layer in the second state, a second surface layer in the second state, and optionally a photon-absorbing layer in an opaque state and interposed between the first and second surface layers, wherein the optical shutter absorbs photons, or alternatively an electric current is applied, to change at least one of the first and second surface layers to the first state of low reflectivity and to change the optional photon-absorbing layer, if present, to a transparent state at the range of wavelengths. In one embodiment, the optical shutter is reversibly imageable between the first and second states. In one embodiment, the optical shutter absorbs photons to change both of the first and second surface layers to the first state of low reflectivity. In one embodiment, the optical shutter responds to the application of an electric current to change both of the first and second surface layers to the first state. In one embodiment, the changes in reflectivity of the first and second surface layers occur at the same time. In one embodiment, one or both of the first and second surface layers of the optical shutter in the second state comprise an organic free radical compound. In one embodiment, the organic free radical compound is reflective at the range of wavelengths. In one embodiment of the optical shutter of this invention, the reversible imaging from the first state to the second state occurs with no external energy. In one embodiment, the reversible imaging from the first state to the second state is induced by heat. In one embodiment, the reversible imaging from the first state to the second state is induced by absorption of photons from one or more wavelength ranges selected from the group consisting of ultraviolet wavelength ranges, visible wavelength ranges, and infrared wavelength ranges. In one embodiment, the reversible imaging from the first state to the second state is induced by applying an electric current to the optical shutter.

In one embodiment, the first and second surface layers are in direct contact to the photon-absorbing layer. In one embodiment, at least one of the first and second surface layers are not in direct contact to the photon-absorbing layer. In one embodiment, the optical shutter comprises two or more photon-absorbing layers interposed between the first and second surface layers. In one embodiment, the first surface layer is in direct contact to a first one of the two or more photon-absorbing layers and the second surface layer is in direct contact to a second one of the two or more photon-absorbing layers. In one embodiment, the photon-absorbing layer comprises an organic free radical compound and absorbs photons to form a reaction product having a change in absorption at the range of wavelengths. In one embodiment, the absorption of photons images the optical shutter from the second state to the first state, and, preferably, the reaction product is formed from the free radical compound.

The terms "near-infrared wavelength region," "near-infrared wavelength," and "near-infrared," as used interchangeably herein, pertain to wavelengths from 700 nm to 2000 nm. The terms "visible wavelength region," "visible wavelength," and "visible," as used interchangeably herein, pertain to wavelengths from 400 to 700 nm.

In a preferred embodiment of the optical shutters and modulators of this invention, the organic free radical compound is a salt of a radical cation, more preferably of an aminium radical cation, and most preferably, the salt of the radical cation is a tris(p-dialkylaminophenyl)aminium hexafluoroantimonate. In another most preferred embodiment, the organic free radical compound is a salt of a tetrakis[4-(dialkylamino)phenyl]-1,4-benzenediamine radical cation, such as, for example, the hexafluoroantimonate salt of tetrakis[4-(dibutylamino)phenyl]-1,4-benzenediamine radical cation. Besides n-butyl groups, other suitable alkyl groups include any of the alkyl groups, such as, for example, methyl, ethyl, 2-propyl, n-pentyl, and n-hexyl, and combinations thereof. In one embodiment, the organic free radical compound is a salt of a radical anion, preferably the salt of an anthrasemiquinone radical anion.

In one embodiment, the optical shutters and modulators of this invention comprise a surface layer having a first state of a low reflectivity, such as a 45° or other angle of reflectivity of less than 1% at a range of wavelengths and preferably of 0%, wherein the optical shutters and modulators are switched by the absorption of photons or, alternatively, by the application of an electric current, to form a second state of a high reflectivity, such as a 45° or other angle of reflectivity of more than 3%, preferably more than 80%, more preferably more than 90%, and most preferably more than 95%, at the range of wavelengths; and wherein the optical shutter is reversibly imageable between the first and second states of low and high reflectivity, respectively. In one embodiment, the absorption of photons or, alternatively the application of an electric current, images the optical shutter from the first state to the second state, and preferably, the reaction product is an organic free radical compound. In one embodiment, the absorption of photons or, alternatively the application of an electric current, images the optical shutter from the second state to the first state, and preferably, the reaction product is formed from an organic free radical compound. In one embodiment, the absorption of photons or, alternatively the application of an electric current, reversibly images the optical shutter between the first and second states.

In a preferred embodiment of the optical shutters and modulators of this invention, the surface layer of the optical shutter comprises an organic free radical compound that is reflective and reversibly images between a non-reflective state and a reflective state. In one embodiment, the optical shutter comprising the organic free radical compound that is reflective is imaged from the second state to the first state by the absorption of photons and, preferably, the reaction product in the first state is formed from the reflective free radical compound. In one embodiment, the optical shutter comprising the organic free radical compound that is reflective is imaged from the second state to the first state by applying an electric current.

The optical shutter of the present invention may be utilized in a variety of product applications. In one embodiment, the optical shutter is utilized in an optical switch device for a fiber optic communications channel. In one embodiment, the optical shutter is utilized in an optical modulator for a fiber optic communications channel. In one embodiment, the optical shutter is utilized in an optical modulator for an integrated optical interconnect for a computer chip.

In one embodiment, the range of wavelengths is from 400 to 2000 nm. In one embodiment, the range of wavelengths is from 1000 to 1700 nm. In one embodiment, the range of wavelengths is from 1400 to 1700 mn. In one embodiment, the range of wavelengths is from 1500 to 1700 nm.

In one embodiment of the optical shutters and modulators of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In one embodiment of the optical shutters and modulators of this invention, the electron transfer reaction induced by applying an electric current occurs in less than 1 microsecond after applying the electric current through the optical shutter, preferably occurs in less than 1 nanosecond, more preferably occurs in less than 0.1 nanoseconds, and most preferably occurs in less than 0.01 nanoseconds.

In one embodiment of the optical shutters and modulators of the present invention, the electron transfer reaction, whether induced by photons, by applying an electric current, or thermally, is an oxidation or a reduction of the organic free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound. For example, the oxidation product of a radical cation may be a diradical dication which may readily undergo reverse electron transfer reactions to regenerate the radical cation. Also, for example, the reduction product of a radical anion may be a dianion which may readily undergo reverse electron transfer reactions to regenerate the radical anion and, in the case of an anthrasemiquinone radical anion and the corresponding dianion, this could involve the controlled presence of oxygen during the reverse electron transfer reaction. Also, for example, the electron transfer reaction may involve the reversible transfer of an electron from the anion of the salt of a radical cation to the radical cation moiety.

In one embodiment of the optical shutters and modulators of the present invention, the photo-induced electron transfer reaction is induced by ultraviolet radiation. In one embodiment, the photo-induced electron transfer is induced by visible radiation, and preferably is induced by near-infrared radiation. In one embodiment, the photo-induced electron transfer reaction is induced by absorption of photons by a free radical ground state of the free radical compound. This is particularly important where the excited states of the free radical moiety ground state of the free radical compound can not be efficiently populated by absorption by a non-free radical ground state, such as, for example, by an aromatic moiety ground state, and by its subsequent internal conversion to a lower excited state related to the free radical moiety ground state.

A wide variety of organic free radical compounds, such as various neutral free radicals, salts of radical cations, and salts of radical anions, may be utilized in the optical shutters and modulators of the present invention. Particular advantages for the use of organic free radical compounds in the optical shutters and modulators of this invention include, but are not limited to, their extremely intense near-infrared absorptions and/or reflectivities at the desired wavelengths for optical Internet and other applications; their large absorption and/or reflectivity changes over a broad range of wavelengths; their extremely transparent and non-reflective states in the near-infrared when switched by the transfer of one or more electrons by the absorption of photons, by applying an electric current, or thermally; their unique ultra-high speed photon conversions at as fast as sub-picosecond times; their stability to degradation by heat, light, or ambient conditions of moisture and air; their ease of fabrication by, for example, coating or plastic molding; and their non-toxicity.

Their extremely intense absorptions and/or reflectivities over a broad range of wavelengths are particularly beneficial in reducing the amount of material that is needed to produce the desired reversible change in the optical shutters and modulators and thereby allow the optical shutters and optical modulators to be made on a very miniature scale, such as less than 8 microns for the thickness of the optical shutter which causes the reflectivity and/or absorption change. This layer may be made much thicker than 8 microns if desired in the fabrication of the optical shutter for use in optical switch devices, modulators, and other optical components, but the amount of the organic free radical compound used may be kept small since the thicker layers do not need to contain any additional organic free radical compound to maintain the desired level of absorption and/or reflection changes. In one embodiment, the thickness of the reflective layer of the optical shutters of this invention is 0.01 to 100 microns. In one embodiment, the thickness of the reflective layer is 0.02 to 8 microns. In one embodiment, the thickness of the reflective layer is 0.04 to 1 micron.

For example, IR-165 and IR-126 are illustrative of one type of the organic free radical compounds for the optical shutters of this invention and may be reversibly formed in a photon-induced one electron transfer reaction, where IR-126 is the one-electron reduction product of IR-165 and, conversely, IR-165 is the one-electron oxidation product of IR-126. IR-165 has an extremely high molar extinction coefficient of about 80,000 liters/mole-cm at 1065 nm where photon excitation may be done and has low molar extinction coefficients of less than about 5,000 liters/mole-cm in the 1530 to 1620 nm range where optical shutters may be utilized in optical switch devices and other optical components in a fiber optic communications channel. Also, IR-165 has reflectance in the near-infrared region, including in the 1400 to 1700 nm range of wavelengths. IR-126 has a very high molar extinction coefficient of about 40,000 liters/mole-cm in a broad and relatively flat absorption across the 1530 to 1620 nm wavelength range, as well as absorbing at about this same molar extinction coefficient down to about 900 nm and also absorbing out to above 2000 nm.

Assuming that IR-126 is present at about a 25% loading by weight in a photon-absorbing layer of the optical shutter and needs to have an optical density of greater than 3.1 in order to provide greater than 99.9% absorption at the wavelengths in the 1530 to 1620 nm range to obtain the contrast ratio of greater than 30 dB that is desired in an optical shutter in a fiber optic communications channel, the photon-absorbing layer containing IR-126 only needs to be about a minimum of 4 microns thick in the direction that the optical signal travels. Since the optical signals are typically traveling in only one plane of the optical shutter, the dimensions of the optical shutter perpendicularly to this plane may be significantly less or greater than the thickness traveled by the optical signal through the optical shutter. For example, in the case where a source of photons is utilized to switch the optical shutter and is provided from a direction above and/or below the plane of the optical shutter traveled by the optical signals, the optical density may be, for example, only about 1.0 with a thickness of the photon-absorbing layer in that direction of about 1.3 microns when the loading of IR-126 is 25% by weight. When the loading of the compound whose absorption is switching in the optical shutter of this invention is increased or decreased, the dimensions of the photon-absorbing layer may be correspondingly decreased or increased. In the case where IR-126 switches by a reversible one-electron reduction to a highly transparent non-free radical amine, the ability to achieve a contrast ratio of greater than about 1000 or about 30 dB is particularly enhanced.

Assuming, for example, a 25% loading of IR-126 in a photon-absorbing layer of the optical shutter of the present invention with about a 4 micron thickness of the photon-absorbing layer in the direction that the optical signals travel and about a 1.3 micron dimension in the perpendicular directions to the optical signal path, one form for the optical shutter would be a cylinder. The optical signals could pass through the cylinder in the direction of the axis of the cylinder, and the source of photons would be directed at the sides of the cylinder. In the optical shutters comprising a surface layer on each side of the photon-absorbing layer in the direction that the optical signals pass, it is advantageous to keep the thickness of the photon-absorbing layer in this optical signal direction as low as possible so that light reflected off both these surface layers in the reflective state may be collected in the selected output optical path with an efficiency similar to that when the light of the optical signal passes through the optical shutter in its transparent state to another output optical path.

In the case where the surface layers in the reflective state comprise an organic free radical compound having reflectance, such as, for example, IR-99 or IR-165, the surface layer may be comprised of a single reflective layer or of multiple reflective layers with non-reflective layers interposed between the reflective layers to make a reflective stack with individual reflective layers. Even when a reflective stack with multiple reflective layers, such as, for example, 10 individual reflective layers, is present, the overall thickness of the reflective surface layers may be 4 microns or less, since the individual reflective layers of the organic free radical compounds may have a thickness in the range, for example, of only about 0.1 to 0.3 microns and the non-reflective layers between the reflective layers may also have a thickness in the range, for example, of only about 0.1 to 0.3 microns.

To aid in this efficient collection of the optical signal into the output optical path, a variety of light collection elements, such as, for example, a focusing lens for an optical shutter in a free space configuration or a tapered waveguide of greater dimensions next to the reflective surface area in a waveguide configuration, may be utilized with the optical shutters, switch devices, and modulators of the present invention.

Also, for example, since each optical shutter in this case would contain about $2 \times 10^{-12}$ grams of IR-126, less than 1 microgram of IR-126 would be needed to make approximately 16,000 optical shutters, such as might be utilized in a 1200×1200 optical switch device. Also, for example, in a case where IR-99 is utilized as a switchable reflective-to-non-reflective material in the surface layers of the optical shutter or in an optical modulator, the amount of IR-99 in each optical shutter or modulator would be in the same range as described above for IR-126. Also, for example, due to the extremely small size of the optical shutters, a 1200×1200 optical switch device could have a volumetric size as small as 0.001 cm$^3$ or even smaller, although a larger size might be selected for ease of fabrication and integration with the source of photons, electric current, and other energy sources to provide switching and for the ease of integration with other optical components.

Since the reversible electron transfer involved in the switching of the optical shutters, switch devices, and modulators of this invention does not require a chemical bond breaking, the speeds of the optical switching may be as fast as the sub-picosecond range. These fast speeds are particularly advantageous for optical shutters for use in nanosecond optical packet switching, as known in the art of fiber optic communications channels and for optical modulators for use in 10 Gbps and higher speed optical transmission systems.

The wavelengths of the photons absorbed by the photon-absorbing layer to form the reaction product of an organic free radical compound may be selected from a wide variety of wavelengths depending on the absorption spectra of the organic free radical compound and of the photon-absorbing layer, the wavelengths available from the source of photons, and any need to avoid using a wavelength that may interfere with the wavelength at which the optical shutter has its states of low and high absorptions and/or reflectivities and is designed to operate as an "on-off" switch.

A wide variety of sources of the photons to form the reaction product and, when radiation is used to induce the reverse reaction, to regenerate the starting organic free radical compound, may be utilized. Suitable sources of photons include, but are not limited to, lasers, continuous light sources such as mercury lamps, pulsed light sources such as xenon pulse lamps, and electroluminescent lightemitting diodes (LEDs), as known in the art of high intensity sources of photons. It is preferred to provide the photons in pulses such that suitable light sources include pulsed lasers, modulated lasers, and other pulsed light sources.

Alternatively, in one embodiment, with lasers and continuous light sources, a first modulator is interposed between the laser or the continuous light source to provide a desired length of imaging time and a desired imagewise area for the imaging of the optical shutter by the photons. Suitable modulators may be any of the variety of light modulators, such as electro-optic modulators, known in the art of light modulators, depending on the requirements for the "on-off" imaging times, such as, for example, 1.5 picoseconds "on" of providing photons and 20 nanoseconds "off" or, alternatively, 20 nanoseconds "on" and 1.5 picoseconds "off", of the modulator and of the desired imagewise area, such as, for example, a dot or pixel shape of about 6 microns in diameter or of about 6 microns per edge in a square shape, on the photon-absorbing layer of the optical shutter. Also, the optical shutters of the present invention, particularly when the application of an electric current reversibly images the optical shutters, may be utilized as modulators for the light source that images the optical shutters by photons.

In one embodiment, wherein the reverse reaction to regenerate the organic free radical compound is induced by radiation selected from the group consisting of ultraviolet radiation, visible radiation, and infrared radiation, a second modulator may be interposed between the source of the radiation and the optical shutter to provide a desired length of imaging time and a desired imagewise area for the reverse reaction of the optical shutter by the radiation. Suitable modulators for the photon-induced reverse reaction may be any of the variety of light modulators, such as electro-optic modulators, known in the art of light modulators, depending on the requirements for the "on-off" imaging times, such as described above for the first modulator, and of the desired imagewise area, such as a dot or pixel shape of about 6 microns in diameter or of about 6 microns per edge in a square shape, on the photon-absorbing layer of the optical shutter. In one embodiment, the wavelength of the photons to form the reaction product from the organic free radical compound is different from the wavelength of the radiation inducing the reverse reaction of the reaction product. Also, as described above for the first modulator, the optical shutters of this invention may be utilized for the second modulator, as well as for other optical modulator applications.

Suitable salts of organic radical cations for the optical shutters and modulators of this invention include, but are not limited to, salts of an aminium radical cation. The choice of the counteranion for the salt depends on a variety of factors such as, for example, the desired speed of the photo-induced or other switching reaction, such as results from the application of an electric current at a low voltage such as 0.1 to 5 volts, to form the reaction product from the organic free radical compound, the desired speed of the reverse reaction of the reaction product to regenerate the starting organic free radical compound, and the required stability of any photon-absorbing layers and of any reflective layers where a reflective organic radical cation salt is utilized, against degradation by oxygen, moisture, and photon exposures and against possible side reactions in switching during the operation of the reversible optical shutters and modulators.

For example, an anthrasemiquinone radical anion is one type of a counteranion to use with an aminium radical cation, such as an IR-165 type aminium radical cation, since the anthrasemiquinone radical anion is an electron-donating material which may participate by being oxidized in the photon-induced reduction of the aminium radical cation and also may participate in the reverse reaction of the reaction product to regenerate the starting aminium radical cation by a simultaneous reverse reduction to reform the anthrasemiquinone radical anion, particularly when the reverse reaction is induced or sensitized by ultraviolet, visible, or infrared radiation absorbed by the oxidation product, such as the corresponding anthraquinone, of the anthrasemiquinone radical anion. By the proper selection of the type of anthrasemiquinone radical anion derivative, the anthrasemiquinone radical anion of the combined aminium radical cation-anthrasemiquinone radical anion salt may be the organic free radical that absorbs the photons to form the reaction product having a change in absorption at the wavelength, and the aminium radical cation may participate in promoting this photon-induced reaction and in promoting the reverse reaction to regenerate the starting anthrasemiquinone radical anion.

The organic nature of the organic free radical compounds and of the avtive switching layers of the optical shutters and modulators of the present invention are advantageous for ease of fabrication, such as by conventional methods of coating or plastic molding, in comparison to inorganic glass or inorganic semiconductor materials typically used in all-optical or hybrid optical shutters and modulators. For example, since only the area of the photon-absorbing layer that receives photons is imaged and acts as an optical shutter, the optical shutter may be made for ease of fabrication and possible extension of its product lifetime with a photon-absorbing layer of greater thickness and surface area than is needed. This excess photon-absorbing layer may be utilized later if the original optical shutter has degraded and a new optical shutter is needed by re-positioning the optical shutter to then expose this excess, previously unused photon-absorbing layer as the replacement optical shutter in the product application.

The unique properties of the optical shutter of the present invention are adapted for use in a variety of optical components for fiber optic communications channels, such as, for example, for an optical modulator, an optical switch device, an optical buffer, an optical router, and a tunable optical gain filter or variable optical attenuator (VOA).

The optical shutter of the present invention may be utilized in any of the optical switch devices known in the art of fiber optic communications channels where the optical switch devices utilize one or more optical shutters, or optical gates as optical shutters are often referred to in fiber optic applications, that operate by a reversible imaging between states of low and high absorptions, including where there is also simultaneous reversible imaging between states of low and high reflectivity. Each of these types of reversible imaging of optical shutters or optical gates are described herein for the optical shutter of this invention.

One aspect of the optical switch devices of this invention pertains to an optical switch device comprising one or more input optical paths, two or more output optical paths, and one or more optical shutters, which one or more optical shutters are imageable by photons and have a first state of a low absorption at a wavelength and a second state of a high absorption at the wavelength, at least one of the one or more optical shutters comprising a photon-absorbing layer, wherein the photon-absorbing layer comprises an organic free radical compound and is characterized by absorption of photons by the free radical compound to form a reaction product having a change in absorption at the wavelength and by a reverse reaction of the reaction product to regenerate the free radical compound; and wherein at least one of the one or more optical shutters is reversibly imageable between the first and second states of absorption; and further wherein at least one of the one or more optical shutters further comprise a surface layer having a low reflectivity state at the wavelength, wherein the at least one of the one or more optical shutters absorbs photons to form a surface layer having a high reflectivity state and by a reverse reaction of the high reflectivity state to regenerate the low reflectivity state of the surface layer; and wherein the at least one of the one or more optical shutters is reversibly imageable between the low and high reflectivity states; and wherein the optical switch device is capable of switching an optical signal of the wavelength entering the switch device from a first input optical path to exiting the switch device in a first or a second output optical path. In one embodiment, instead of utilizing photons for imaging, the one or more optical shutters are reversibly imageable by applying an electric current through the photon-absorbing layers and the surface layers having a low and a high reflectivity state. For example, an organic free radical compound in the photon-absorbing layer and/or in the reflective surface layer, forms a reaction product having a change in absorption and/or reflectance at the wavelength by the application of an electrical current through the optical shutter and undergoes a reverse reaction of the reaction product to regenerate the organic free radical compound.

Still another aspect of this invention pertains to an optical switch device comprising one or more input optical paths, two or more output optical paths, and one or more optical shutters, the one or more optical shutters having a first state of transparency and of low reflectivity at a range of wavelengths and a second state of high reflectivity at the range of wavelengths, and at least one of the one or more shutters comprising a first surface layer in a transparent state, a second surface layer in a transparent state, and optionally a photon-absorbing layer in a transparent state and interposed between the first and second surface layers, wherein the at least one of the one or more optical shutters, as described herein, that comprise the photon-absorbing and surface layers, absorbs photons to change at least one of the first and second surface layers to a state of high reflectivity and optionally to change the photon-absorbing layer to a state of opacity, and further is reversibly imageable between the first and second states; and wherein the optical switch device is capable of switching an optical signal entering the switch device from one of the one or more input paths to a selected one of the two or more output paths. In one embodiment, instead of utilizing photons for imaging, the one or more optical shutters are reversibly imageable by the application of an electric current through the optional photon-absorbing layers and through the surface layers having a low and a high reflectivity state. For example, an organic free radical compound in the photon-absorbing layer and/or in the reflective surface layer, forms a reaction product having a change in absorption and/or reflectivity at the wavelength by the application of an electrical current through the optical shutter and undergoes a reverse reaction of the reaction product to regenerate the organic free radical compound.

In one embodiment of the optical shutters, switch devices, and modulators of this invention, the at least one of the one or more optical shutters comprising the photon-absorbing and surface layers comprises a metallized layer on at least one side of the photon-absorbing layer. In one embodiment, the metallized layer comprises aluminum.

Many variations and combinations of the optical shutters of the present invention with their flexibility to be "transparent-to-opaque" optical shutters, "opaque-to-transparent" optical shutters, "transparent-to-reflective" optical shutters, and "reflective-to-transparent" optical shutters, as described herein, may be utilized in the designs of the optical switch devices and modulators of this invention, including use in optical switch devices and modulators known in the art where the designs require "transparent-to-opaque" opaque shutters, "opaque-to-transparent" optical shutters, "transparent-to-reflective" optical shutters, and "reflective-to-transparent" optical shutters.

Referring to FIG. 1 (not to scale), in one embodiment of the optical shutters of this invention, the optical shutter 101 has a single photon-absorbing layer 105 interposed between two surface layers 102 and 103. The photon-absorbing layer 105 is in a transparent state when the two surface layers 102 and 103 are in a transparent state to provide the optical shutter 101 in a transparent state. In the reflective state of the optical shutter, the photon-absorbing layer 105 is in an opaque state and the two surfaces 102 and 103 are in a reflective state. As illustrated in FIG. 1, the optical signals are provided to and from the optical shutter 101 through waveguides. Two waveguides 51 and 52, whose internal width where the optical signals are present, is represented by w, intersect at an angle θ with respect to the input paths of the incoming optical signals. In FIG. 3, θ is 90° and in general, 0<θ<180°. The width of the photon-absorbing layer 105 in the optical shutter 101 is denoted as a. The optical shutter 101 is positioned at an angle of θ/2 with respect to the input paths of the incoming optical signals and with its centerline 104 over points A and B of intersection of waveguides 51 and 52.

When the optical shutter 101 is in the transparent state, an optical signal C that is entering the 2×2 optical switch device on the first input path 110 will pass through the optical shutter 101 and exit on the first output path 111. Similarly, an optical signal D that is entering the 2×2 optical switch device on the second input path 112 will pass through the optical shutter 101 and exit on the second output path 113. In contrast, when the optical shutter 101 is in the reflective state, an optical signal C that is entering the 2×2 optical switch device on the first input path 110 will be reflected at surface layer 102 and exit on the second output path 113, and optical signal D that is entering the 2×2 optical switch device on the second input path 112 will be reflected at surface layer 103 and exit on the first output path 111.

Referring to FIG. 1 and considering the state when the optical shutter 101 is in the reflective state on both surfaces, the path of optical signal C when reflected at surface layer 102 into the second output path 113 is shifted relative to the path of optical signal D when the latter exits on the second output path 113 when the optical shutter 101 is in the transparent state. The tapered regions 120 and 121 are useful to efficiently collect the optical signals after they have passed through the optical shutter 101 and to funnel them to a waveguide region of a desired reduced width, such as, for example, the width w of the input waveguides.

A wide variety of shapes are suitable for the tapered region, with FIG. 1 disclosing one alternative. For example, the wider width of the tapered region compared to the width of the input waveguide may be on one side of the output waveguide after the optical signal exits the reflecting surface layer, as for example illustrated in FIG. 1, or it may be divided between both sides of the output waveguide after the optical signal exits the reflecting surface layer, such as, for example, symmetrically divided between both sides. The preferred configuration of the tapered region will be dependent on the position of the optical shutter 101 in the intersection of the two input paths and the two output paths. For example, the minimum width f of the widest width of the tapered region in the section of the output waveguide that is adjacent to the reflective surface layer is the distance between points E and B and equivalently between points B and F in FIG. 1.

The minimum width f depends on w, a, and θ by the relationship shown in equation (1):

$$f = w + [a \cdot \cos(\theta/2)] \tag{1}$$

For the sake of simplicity, the energy source that causes the optical shutter to change its state from transparent to reflective or from reflective to transparent in the 2×2 optical switch device of FIG. 1 is not shown. This energy source may be above and/or below the plane of the optical switch device as this plane is illustrated in the top down view of FIG. 1.

In the case where the energy source is the application of an electric current, electrode pads, for example, may be in contact to the opposing ends of surface layers 102 and 103 in order to reversibly switch the surface layers between reflective and non-reflective states by providing the necessary voltage and current flow across the gap between the electrodes. Similarly, electrode tabs may be in contact to the opposing ends of photon-absorbing layer 105. In a preferred embodiment, a single set of electrode tabs are in contact with the opposing ends of surface layers 102 and 103 and of photon-absorbing layer 105 and thereby a single set of electrode tabs and the application of the electric current between the electrode tabs may reversibly switch all the layers of the optical shutter at the same time.

In one embodiment, the optical signal travels in a waveguide in the one or more input paths immediately prior to, and in a selected one of the two or more output paths immediately after, the optical signal reaches the at least one of the one or more optical shutters comprising the photon-absorbing and surface layers. In one embodiment, the waveguide in the two or more output paths is tapered from a larger dimension in contact to at least one of the first and second surface layers to a smaller dimension at a distance from the at least one of the first and second surface layers.

Figure 2:
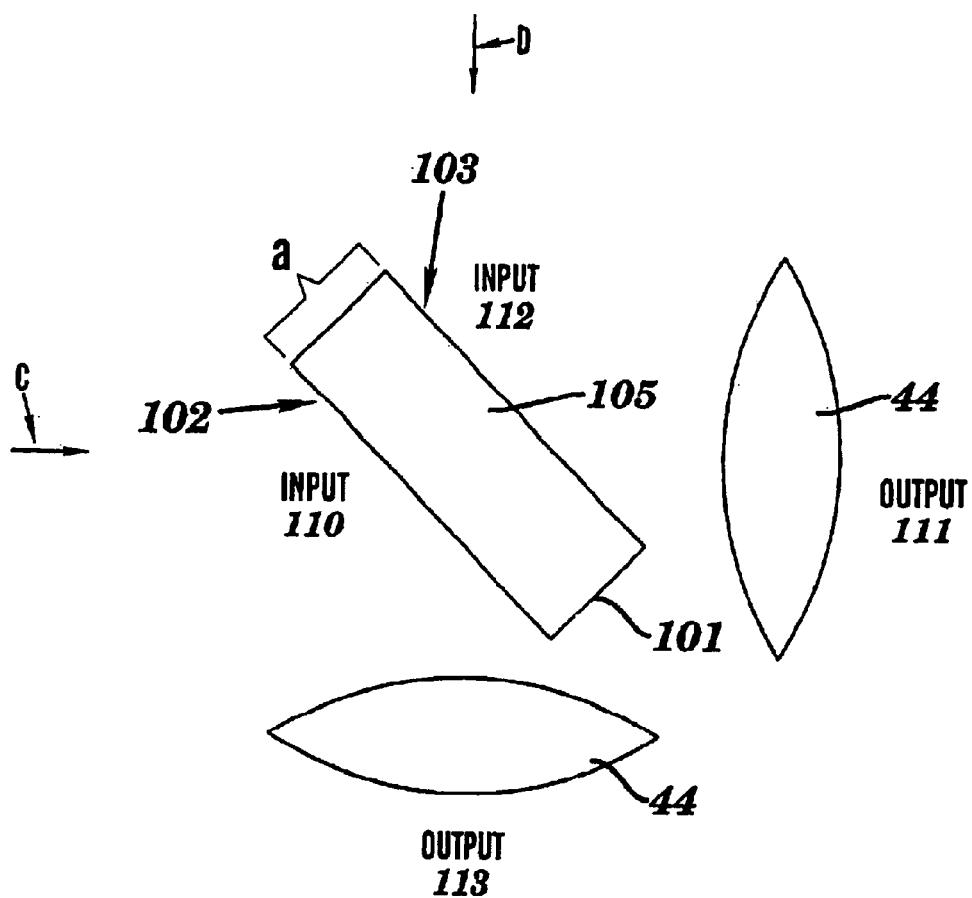
FIG. 2 illustrates a top down view of another embodiment of the optical shutters of this invention and transmitting the optical signals in free space with lenses present in the output optical paths.

Referring to FIG. 2 (not to scale), the numbers and letters have the same meaning as used for these same symbols in FIG. 1. FIG. 2 illustrates one embodiment of a 2×2 optical switch device comprising an optical shutter of the present invention where the optical signals travel into and from the optical shutter in a free space configuration rather than in a waveguide configuration. To efficiently collect the optical signal from the reflective surface layers when the optical shutter is in the reflective state, as well as when the optical shutter is in a transparent state, the tapered regions of the waveguide mode as illustrated in FIG. 1, are replaced with lenses 44 with a suitable curvature to shape and focus the output optical signal to a desired shape. This desired shape is typically less in size than the shape represented by the optical signals as they would exit the optical shutter in an output path from both the reflective and transparent states. In one embodiment, the optical signal travels in free space in the one or more input paths immediately prior to, and in a selected one of the two or more output paths immediately after, the optical signal reaches the at least one of the one or more shutters comprising the photon-absorbing and surface layers. In one embodiment, the optical switch device comprises a lens in the two or more output paths to focus the optical signal.

Figure 3A:
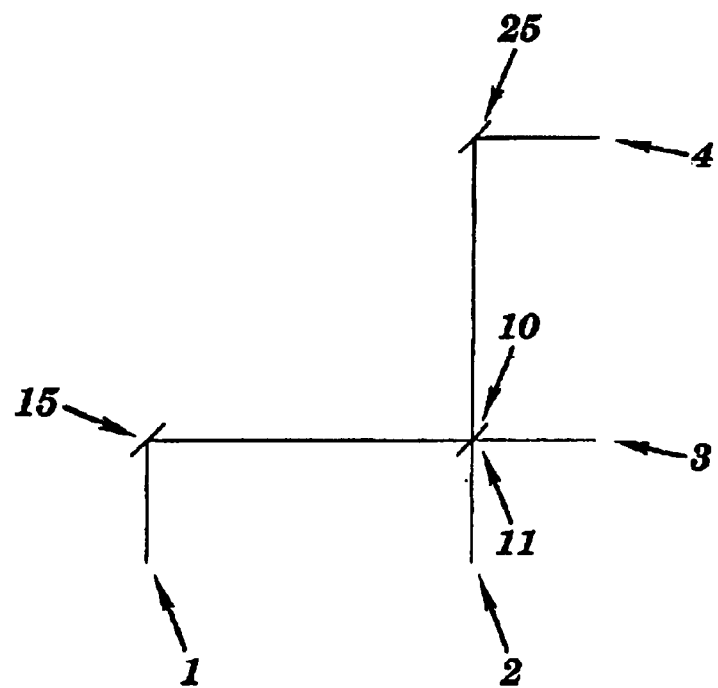
FIG. 3A shows a top down view of one embodiment of the optical switch devices and shutters of the present invention with the optical shutter in the transparent state and having fixed mirrors present to reflect the optical signals in the direction of the output optical paths.
Figure 3B:
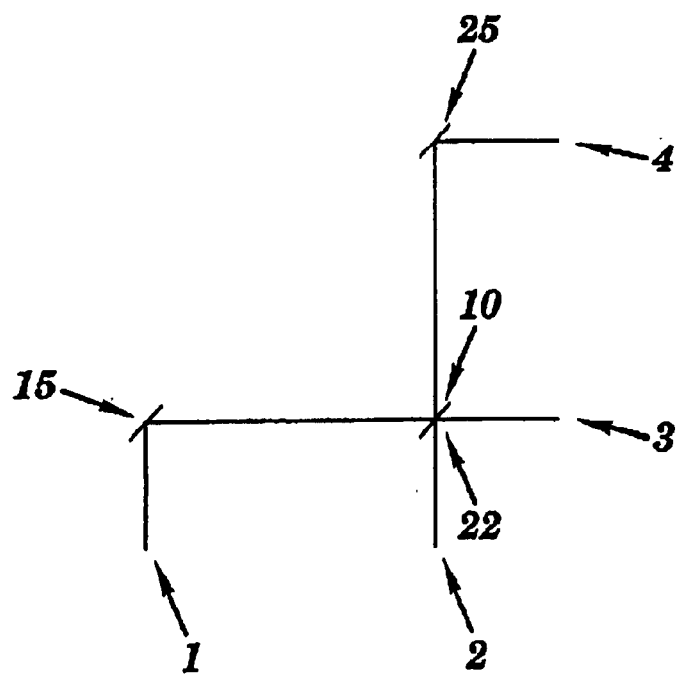
FIG. 3B shows a top down view of one embodiment of the optical switch devices and shutters of the present invention with the optical shutter in the reflective state and having fixed mirrors present to reflect the optical signals in the direction of the output optical paths.

Referring to FIGS. 3A and 3B (not to scale), one embodiment of a 2×2 optical switch device of the present invention is illustrated. For the sake of simplicity, the optical shutter as illustrated in FIGS. 1 and 2, is illustrated in FIGS. 3A and 3B as a single line and, instead of a waveguide mode or a free space mode, only the path of the input and output optical signals is indicated by lines to indicate the paths which could involve either a waveguide mode or a free space mode in the optical shutters and optical switch devices of the present invention.

In FIG. 3A in a top down view, the optical shutter 10 is in the transparent state 11. The optical signal on the first input path 1 reflects from mirror 15 and is directed to pass through the transparent optical shutter 10 and to exit the 2×2 optical switch device on the first output path 3. The optical signal on the second input path 2 passes through the transparent optical shutter 10, reflects from mirror 25, and is directed to exit the 2×2 optical switch device on the second output path 4.

In FIG. 3B in a top down view, the optical shutter 10 is in the reflective state 22. The optical signal on the first input path 1 reflects from mirror 15, is directed to the reflective optical shutter where it is reflected and directed to mirror 25, then reflects from mirror 25, and is directed to exit the 2×2 optical switch device on the second output path 4. The optical signal on the second input path 2 reflects from the reflective optical shutter 10 and is directed to exit the 2×2 optical switch device on the first output path 3.

Figure 4:
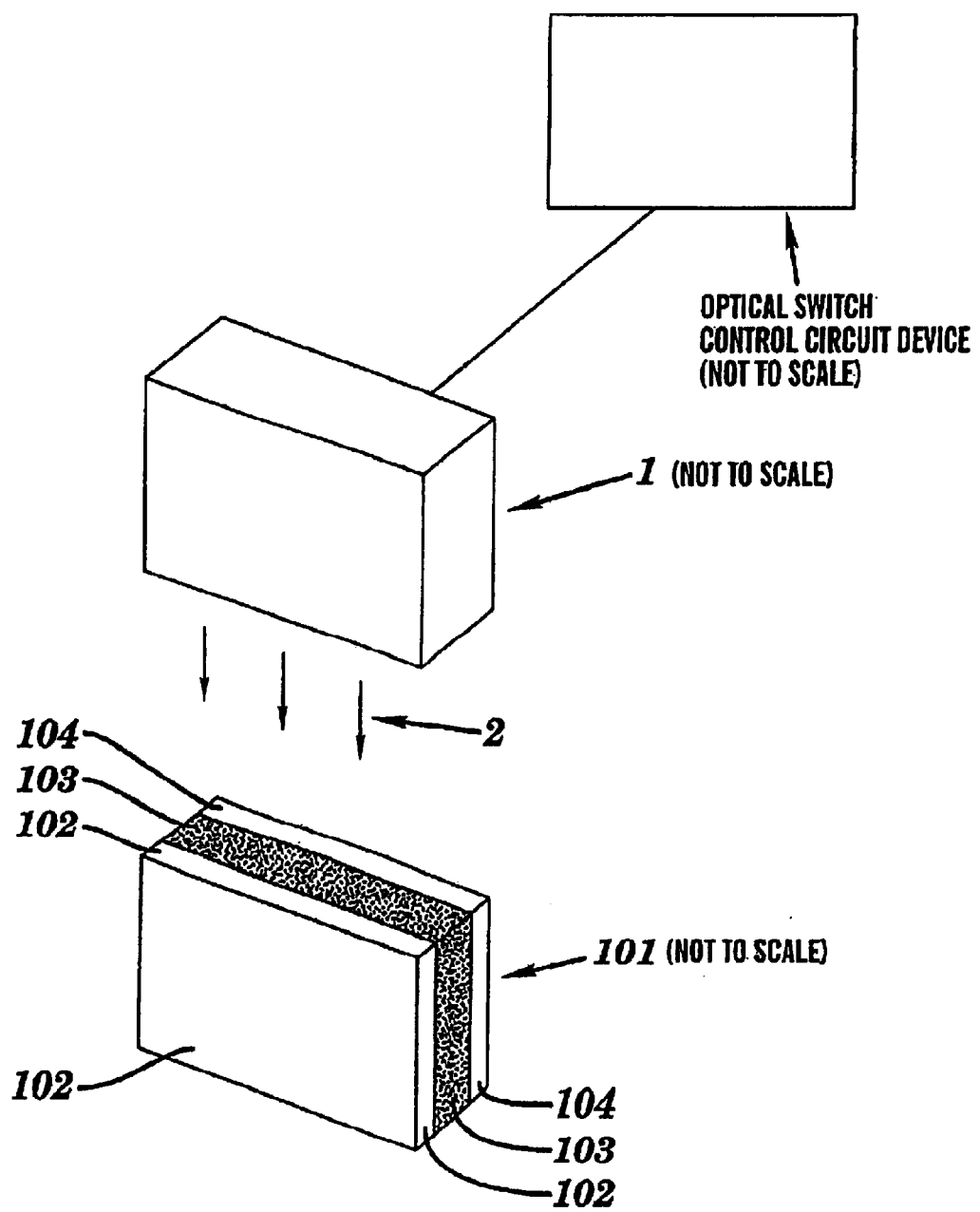
FIG. 4 illustrates one embodiment of the optical shutters of this invention with a source of photons for switching the optical signals when a signal is provided by a optical shutter control circuit device.

Referring to FIG. 4 (not to scale), one embodiment of an energy source in combination with an optical shutter is illustrated for use in the optical shutters, optical switch devices, and optical modulators of this invention. An optical shutter 101 (not to scale) is shown in a perspective view from one side. The optical shutter 101 has a first surface layer 102, a second opposite surface layer 104, and a photon-absorbing layer 103 interposed between the two surface layers. Above the optical shutter 101, there is a source 1 of photons 2 which can provide photons of the desired wavelengths and intensities to cause the optical shutter 101 to change from a transparent to a reflective state or from a reflective to a transparent state. Where photons of different wavelengths are desired to reverse the change of the optical shutter, source 1 may be tunable directly or by the indirect use of filters to provide these photons of different wavelengths or, alternatively, a second source of photons may be positioned below or positioned above in a different exposure path to the optical shutter to cause the reverse photon-induced change in the optical shutter. More than one source of photons may be positioned to provide the desired photolytic exposure of the optical shutter for the forward and for the reverse changes of the optical shutter. For the sake of simplicity, lenses, such as, for example, aspheric lenses, and other optical components known in the art of photolytic imaging for focusing a beam of photons on the desired imagewise area, are not shown in FIG. 4. Also, as shown in FIG. 4, an optical switch control circuit device is connected to the source of photons. The optical switch control circuit device monitors the desired timing for providing the photons and delivers a signal to the source of photons to provide the photons to the at least one of the one or more optical shutters comprising the photon-absorbing and surface layers.

Instead of photons, suitable sources of energy to switch the optical shutters, switch devices, and modulators of this invention include, but are not limited to, electrical current source elements and heating source elements. In one embodiment, the optical shutters, switch devices, and modulators of this invention comprise one or more external energy source elements to provide energy to switch the optical shutter comprising the photon-absorbing and surface layers, wherein the one or more external energy source elements are selected from the group consisting of electrical current source elements, heating source elements, ultraviolet source elements, visible light source elements, and infrared radiation source elements. In one embodiment, the one or more external energy source elements are connected to an optical switch control circuit device that monitors the desired timing for providing the energy and delivers a signal to the one or more external sources of energy to provide the energy to the at least one of the one or more optical shutters comprising the photon-absorbing and surface layers.

2×2 optical switch devices, as illustrated, for example, in FIGS. 1, 2, 3A, and 3B may be readily expanded to larger switch devices, such as, for example, to 1280×1280 optical switch devices where there may be, for example, 16 optical fibers carrying optical signals with each fiber having 80 different wavelengths, such as 80 wavelengths ranging from 1530 to 1620 nm. The "transparent-to-reflective" type of optical shutter, as illustrated, for example, in FIGS. 1, 3A, and 3B with its optical shutter assembly of either two optical shutters in close proximity or a single optical shutter comprising a photon-absorbing layer interposed between two surface layers, may have an overall size as small as, for example, about 8 microns per edge of a cubic shape. If the optical switch device operates by having the 16 incoming fibers of each specific wavelength be demultiplexed and input to the optical switch device in a single plane for each specific wavelength, with the 16 fibers carrying the other 79 specific wavelengths being likewise successively positioned and provided with demultiplexed signals in 79 individual planes parallel and above or below this first plane and further operates by having the optical shutters of each plane offset enough from the optical shutters of any other plane that the source of light from above or below the 80 planes of the optical switch device may image a single individual optical shutter without imaging any other optical shutters, the optical switch device may have a very compact size. For example, the dimensions of a 1280×1280 optical switch device based on this type of "transparent-to-reflective" optical shutter and double optical shutter assembly may be estimated to be as small as about 8 microns multiplied by 16 fibers or 128 microns in one dimension in a single plane of 16 optical signals, about 8 microns multiplied by 80 wavelengths or 640 microns in depth to account for the total of 80 planes for each of the individual wavelengths, and about 8 microns multiplied by 80 wavelengths and then multiplied by 16 signals or 10,240 microns in the second dimension in each single plane carrying optical signals to account for the offsetting to provide the ability to image only a single optical shutter without imaging any other optical shutters. This extremely small size is very advantageous for cost, ease of manufacturing, and space considerations for both optical switch devices and modulators and for the light sources to image the optical switch devices. A waveguide configuration is particularly preferred for the optical switch devices of this invention, especially where the optical switch devices are larger and comprise multiple planes of switching elements as, for example, in the 1280×1280 optical switch devices herein described.

Since the optical switch devices, such as 2×2 optical switch devices and optical modulators, may be used in conjunction with other components, including lasers and other 2×2 optical switch devices, an important feature is the convenient interconnection of the optical components in the case of optical switching devices in both waveguide and free space configurations. The optical switch devices and optical modulators of this invention may have a wide variety of alternative configurations where the input paths and the output paths for the optical signals have various orientations with respect to each other. For example, in FIGS. 1 and 2, the two input paths for the optical signals are perpendicular to each other, and the two output paths for the optical signals are perpendicular to each other and at right angles to the input paths. The optical shutters and modulators of this invention provide excellent flexibility for alternative orientations of the input and the output paths. For example, if it is desired to position two input optical paths such that when the optical shutter is in the transparent state, the two optical signals cross one another at an angle θ where this angle is determined with respect to the incoming paths, and when the optical shutter is in the reflective state, it is desired that the optical signals switch positions on the output optical paths, this may be obtained if the double optical shutter assembly configuration of the optical shutter is positioned with the reflecting surface on the optical input side at an angle of one half of θ to the input optical path.

Figure 5:
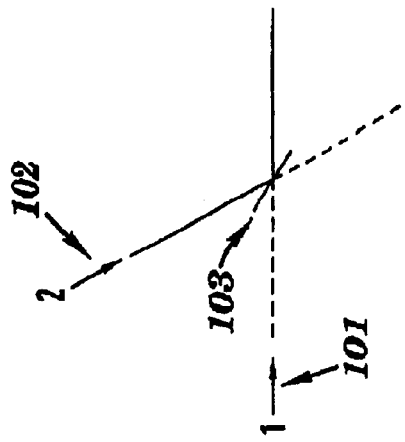
FIG. 5 shows one embodiment of the optical shutters of the present invention in the reflective state with an angle of 30° between the paths of the optical signals and the reflective surfaces of the optical shutters.

For example, referring to FIG. 5 (not to scale) in a top down view similar to that in FIGS. 3A and 3B with the double optical shutter assembly configuration of the optical shutter represented as a single line, the input path 1 for the first optical signal 101 is at an acute angle to the input path 2 for the second optical signal 102. θ in this case is 60° so one half of θ is 30°. For the reflective state of the optical shutter 103, the path taken by the first optical signal 101 is represented by a dashed line, and the path taken by the second optical signal 102 is represented by a solid line. The output paths for both of these optical signals are at an angle of one half of θ or 30° with respect to the plane of the reflecting surfaces of the optical shutter 103.

Figure 6:
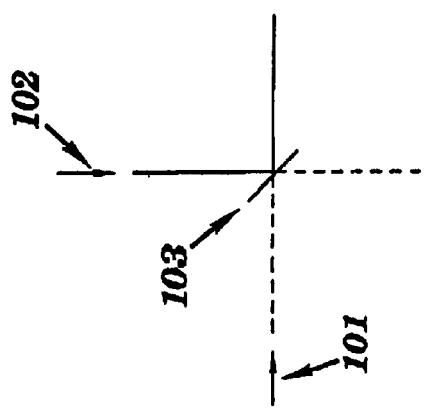
FIG. 6 shows one embodiment of the optical shutters of the present invention in the reflective state with an angle of 45° between the paths of the optical signals and the reflective surfaces of the optical shutters.

FIG. 6 (not to scale) further illustrates the flexibility of the orientation of the input and output optical paths with the optical shutters and switch devices of the present invention. In this case, the input paths for the two optical signals 101 and 102 are at right angles to each other. θ is thus 90°, and one half of θ is 45°. As with FIG. 5, in FIG. 6, for the reflective state of the optical shutter 103, the path taken by the first optical signal 101 is represented by a dashed line, and the path taken by the second optical signal 102 is represented by a solid line. The output paths for both of these optical signals are at an angle of one half of θ or 45° with respect to the plane of the reflecting surfaces of the optical shutter 103.

Figure 7:
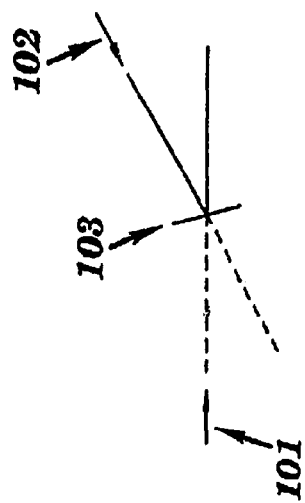
FIG. 7 shows one embodiment of the optical shutters of the present invention in the reflective state with an angle of 75° between the paths of the optical signals and the reflective surfaces of the optical shutters.

FIG. 7 (not to scale) provides another illustration of the flexibility of the orientation of the input and output optical paths with the optical shutters of this invention. In this case, the input paths for the two optical signals 101 and 102 are at an angle of 150° to each other, and one half of θ is 75°. As with FIGS. 5 and 6, for the reflective state of the optical shutter 103, the path taken by the first optical signal 101 is represented by a dashed line, and the path taken by the second optical signal 102 is represented by a solid line. Accordingly, the output paths for both of these optical signals is at an angle of one half of θ or 75° with respect to the plane of the reflecting surfaces of the optical shutter 103.

FIGS. 8A and 8B (not to scale) are schematic top-down views of one embodiment of the optical modulators of the present invention. In FIGS. 8A and 8B, an input optical signal 10 is present in input optical path 20 and is incident on active material 30. Active material 30 is positioned so that a surface 40 is at a 45° angle with respect to optical signal 10. In FIG. 8A the active material 30 is in a state of high reflectivity and most of the input optical signal 10 is reflected at surface 40. The reflected signal is not shown in the figure and may be directed to a permanently absorptive material. FIG. 8A further displays the embodiment of the active material 30 whereby it is non-absorptive when in the state of high reflectivity. In this case, a residual portion of input signal 10 passes through active material 30 and constitutes the output optical signal 50 in the output optical path 60. In contrast, in FIG. 8B, the active material 30 is in a state of transparency and low reflectivity and input optical signal 10 passes through active material 30 and constitutes the output optical signal 50 in the output optical path 60. Below and above the plane of FIGS. 8A and 8B (not shown) are preferably electrodes and optionally interfacial layers between the electrodes and the active material. A time varying voltage which encodes the binary information signal is applied to the electrodes and effects the electrically induced change of state of the active material 30.

FIGS. 9A and 9B (not to scale) display another embodiment of the optical modulators of the present invention. In contrast to FIGS. 8A and 8B, in FIGS. 9A and 9B the output signal path is positioned to obtain the optical signal that is reflected at surface 40. As in FIGS. 8A and 8B, an input optical signal 10 is present in input optical path 20 and is incident on active material 30. Active material 30 is positioned so that a surface 40 is at a 45° angle with respect to optical signal 10. In FIG. 9A the active material 30 is in a state of high reflectivity and most of the input optical signal 10 is reflected at surface 40 and constitutes the output optical signal 50 on output optical path 60. In contrast, in FIG. 9B, the active material 30 is in a state of transparency and low reflectivity, and input optical signal 10 passes through active material 30 and essentially none of the input optical signal 10 is reflected at surface 40. Hence, the consequent absence of photons on the output optical path 60 constitutes the output optical signal 50.

One can associate the encoded binary information with the state of the active material 30 in FIGS. 8 and 9, using the common practice that a logical 0 is encoded by the absence of power, or very low power, in the output optical signal, and a logical 1 is encoded by the presence of power, or much higher power, in the output optical signal. Thus, in the embodiment of FIGS. 8A and 8B, a logical 0 is associated with the active material 30 being in the state of high reflectivity, and a logical 1 with the active material being in the state of transparency and low reflectivity. In contrast, in the embodiment of FIGS. 9A and 9B, a logical 0 is associated with the active material 30 being in the state of transparency and low reflectivity, and a logical 1 with the active material 30 being in the state of high reflectivity.

One characteristic property of the reflective organic free radical semiconductor layers is that their reflectance is specular, i.e., it is mirror-like and has the same angle of reflectance as the angle of incidence of the light. The reflectance of these organic semiconductor layers is not diffuse. Partly because of this property of specular reflectance, when the electro-optic reflective organic free radical active materials are used the preferred angular orientation of the active region of the modulator is expected to be 45° to the direction of the incident optical signal, as for example illustrated in FIGS. 8 and 9, although a variety of other angular orientations from 0° to 90° may be utilized.

In one embodiment of the optical modulators of the present invention, the reflectivity of the active material is enhanced with a reflective stack of two or more layers comprising the active material and one or more non-reflective and transparent layers interposed between the two or more active layers. FIG. 10 (not to scale) illustrates this embodiment for the configuration shown in FIG. 8A. In contrast to FIG. 8A, in FIG. 10 the active material 30 is replaced with a stack of alternating layers of active material 30 and static, non-reflective, and transparent layers 32. Although for the sake of simplicity, three layers of active material are shown in FIG. 10, more or fewer layers of active material could be used. For one skilled in the art it is evident that the embodiment of the reflective stack also pertains for the configurations shown in FIGS. 8B, 9A, and 9B, where in the latter two figures, the output signal path could include a funneling waveguide or focusing lens.

In one embodiment of the optical shutters, switch devices, and modulators of the present invention, the reaction product formed in the photon-absorbing layer is an organic free radical compound. In one embodiment, the absorption of photons images the at least one of the one or more optical shutters comprising the photon-absorbing and surface layers from the second state to the first state, and preferably, the reaction product is formed from the free radical compound. In one embodiment, the free radical compound is a salt of an aminium radical cation. In a preferred embodiment, the free radical compound is a salt of a tetrakis[4-(dialkylamino)phenyl]-1,4-benzenediamine radical cation. In a preferred embodiment, the free radical compound is a salt of a N,N-dialkyl-N',N'-bis[4-(dialkylamino)phenyl]-1,4-benzenediamine radical cation. In one embodiment, the free radical compound is a salt of an anthrasemiquinone radical anion. In one embodiment, the wavelength range of the photons to form the reaction product comprises one or more ultraviolet wavelengths. In one embodiment, the wavelength range of the photons to form the reaction product comprises one or more wavelengths from 400 to 700 nm. In one embodiment, the wavelength range of the photons to form the reaction product comprises one or more wavelengths from 700 to 2000 nm. In one embodiment, the flow of an electric current is utilized to form the reaction product. In one embodiment of the optical switch devices of this invention, the reversible imaging between the first and second states is induced by the flow of an electric current.

In one embodiment of the optical shutters, switch devices, and modulators of this invention, the optical signal is reflected from the at least one of the first and second surfaces at an angle from 1° to 90°, as illustrated, for example, in FIGS. 5, 6, and 7. In one embodiment, the optical signal is reflected from the at least one of the first and second surfaces at an angle of 45°, as illustrated, for example, in FIG. 6.

In one embodiment of the optical shutters, switch devices, and modulators of this invention, the optical shutters may comprise three or more surface layers in a transparent state and an optional photon-absorbing layer in a transparent state and interposed between each of the three or more surface layers. For example, the optical shutter could be cubic in shape and have 6 surface layers with the photon-absorbing layer between each of the 6 surface layers or have 3 to 5 only of the sides of the cubic-shaped optical shutter that are surface layers that reversibly image between a transparent state and a reflective state while the photon-absorbing layer reversibly images between a transparent state and an opaque state. These optical shutters and switch devices with three or more transparent-to-reflective surface layers may be useful in certain applications requiring a more complex geometry for the paths of the optical signals.

In one embodiment of the optical switch and modulator devices of this invention, the optical devices further comprise an optical wavelength conversion element to convert the optical signal at the wavelength, such as 1542 nm, to a second different wavelength, such as 1544 nm. For example, this provides additional flexibility in switching the optical signals to other output paths, such as to other available wavelengths in the same or different optical fiber. Preferred are optical wavelength conversion elements which are capable of converting the optical signal to a different wavelength that is one, two, or three wavelengths above or below the wavelength of the input optical signal. Stable organic free radical compounds typically have large molecular structures in order to stabilize the free radical moiety. As such, they typically have large molecular cross-sections, very high absorption extinction coefficients, and often sub-picosecond speed conversions of photons absorbed to heat, to electron transfer reactions, and to luminescence. Accordingly, these organic free radical compounds may be modified to provide non-linear optical properties that alter the frequency of the photons passing through a layer comprising the organic free radical compound and thereby provide a wavelength conversion to the photons. In one embodiment, the optical wavelength conversion layer comprises an organic free radical compound. In one embodiment, the optical switch and modulator devices further comprise an optical wavelength conversion element to convert the optical signal having a first wavelength to an optical signal of a second different wavelength. In one embodiment, the optical wavelength conversion element comprises an organic free radical compound as an active material for converting the wavelength of the optical signal having the first wavelength.

Thus, the reflective optical shutters comprising a reflective material, such as a reflective organic free radical compound, of the present invention are adapted to provide a unique "electro-reflective" modulator, where the optical modulator is reversibly switched by the injection and removal of electrons, such as by the flow of an electric current and where the switching is from non-reflective and transmissive to reflective states. Preferred electro-reflective modulators are those where the reflective material reflects but does not absorb at the wavelengths that are being modulated. This preferred embodiment has features such as, for example, reduced exposure of the modulator to incident photons that may cause degradation and reduced insertion loss of the reflected optical signals.

Further, for example, the reflective optical shutters and optical switch devices of this invention may be utilized in the variety of applications for mirror-like reflectivity where MEMS devices are now utilized, such as, for example, in optical switch arrays and in reflective elements for projectors for computers, movies, HDTV, and other digital projection applications.

The preferred optical transmission configuration for the optical shutters, optical switch devices, and optical modulators of this invention is a waveguide configuration. Besides utilizing silica, polymer, sol gel, and other waveguide materials as known in the art of optical waveguides, the optical shutters, optical switch devices, and optical modulators of this invention may utilize an optical waveguide comprising a material selected from the group consisting of organic free radical compounds; and non-free radical products by electron transfer of an organic free radical compound. Preferred materials for the optical waveguides of this invention are non-free radical products by electron transfer of an organic free radical compound, since these non-free radical products are typically in the non-reflective and transmissive state and thus are most suitable for high transmission efficiencies and low insertion losses in the waveguides. Other advantages of using these non-free radical products are that they may be activated only in the areas desired to be active switching areas by providing the appropriate access to the source of external energy for switching and, if needed, by doping with one or more materials to activate the waveguide to switching; and they typically have similar indices of refraction to the corresponding organic free radical compounds so that coupling losses and other optical signal degradations between the passive optical waveguide and the dynamic optical shutters are minimized. For example, electrode tabs could be provided in the region of the optical shutter for switching electrically, or a sensitizing dye could be doped into the waveguide in the region of the optical shutter for switching photonically.

Another advantage of the organic free radical compounds is the excellent intensity of their absorption and reflectance properties which permit the optical shutters and optical switch devices of this invention to be very small. For example, an individual optical shutter may be less than 1 micron in the optical path length direction and also less than 1 micron in the orthogonal directions, if desired and consistent with transmission and coupling of the optical shutter into the overall optical system.

The sub-wavelength size of the active optical shutters and optical devices of this invention, such as, for example, 0.5 to 1.0 dimensions in contrast to the 1.3 to 1.7 micron wavelength of the optical signal in many applications lends itself to integration with a variety of waveguide materials, including, for example, waveguide materials comprising the reaction products of an organic free radical compound, as described hereinabove. Also, since optical amplifiers may comprise organic free radical compounds, as for example described in U.S. patent application Ser. No. 09/944,935, now U.S. Pat. No. 6,577,441, to Carlson of the common assignee, the disclosure of which is fully incorporated herein by reference, the sub-wavelength integration of the optical components may extend from optical shutters, optical switch devices, and optical modulators to include optical amplifiers and optical lasers, where the optical lasers could also operate on the same principle of stimulated emission from an organic free radical compound, such as, for example, an aminium free radical compound.

Thus, the optical shutters, optical switch devices, and optical modulators of this invention have the feature of being able to be integrated into an optical bench or chip where nearly all or all of the optical components from passive components such as waveguides to the active components from lasers, modulators, amplifiers, switch fabrics, multiplexers, demultiplexers, dispersion compensators, tap monitors, gain filters, buffers, wavelength converters, detectors, and other dynamic optical components are integrated into one monolithic unit in either a planar or a three-dimensional configuration on a substrate, such as, for example, on a silicon substrate for further integration with the purely electrical components of the optical system. All of these integrated components may optionally comprise an organic free radical compound or an electron-transfer reaction product of an organic free radical compound as an active material in the case of dynamic optical components and as a passive material in the case of passive optical components such as an optical waveguide.

The applications for the optical shutters, switch devices, and modulators of this invention extend beyond Internet transmission applications and include, but are not limited to, applications for optical interconnects where optical signal transmission and detection is used to very rapidly move signals from one point to another, such as in very high speed computing where the use of all-electrical devices does not provide adequate bandwidth, speed, and thermal and power characteristics.

The reflectivity of optical modulators of the present invention is dynamic whereby the optical modulator reversibly changes state between reflective and non-reflective. This is in contrast to optical modulators that either: (1) do not contain a reflective component, such as electro-absorption modulators as known in the art, such as, for example, those based on indium phosphide (InP), or (2) do contain a reflective component that is permanenetly, such as a permanent, which may or may not physically move. Also, the reversible reflectivity of the present invention is realized by electron or photon induced alteration of the properties of the active material such that the surface of the material becomes, or reverts from being, specularly reflective. This is in contrast to electro-optic modulators that reversibly change between reflective and non-reflective states based on diffraction and interference effects, as, for example, in Bragg gratings.

Another distinguishing attribute of the reversibly reflective state of the present invention is that the surface of the active material, when reflective, is reflective for a broad range of wavelengths. In one embodiment, the surface is reflective for wavelengths from 700 nm to over 3000 nm. In contrast, the reversibly reflective state of electro-optic modulators based on a Bragg grating is reflective for only a narrow range of wavelengths. In principle, the Bragg grating is reflective for a single wavelength, the Bragg wavelength, and in practice has some reflectance over a very narrow wavelength band with a sharp fall-off in power for deviations from the Bragg wavelength. Typically the reflected power is less than –10 dB or –20 dB for wavelengths that are 0.1 nm or more deviant from the Bragg wavelength. Appreciable reflectance over a wide wavelength band of, for example, 5 nm or more, is antithetical to the underlying interference effect upon which the reflectance is attained for modulators utilizing a Bragg grating.

In summary, none of the prior art on reflective electro-optic modulators has an active material with the property that one or more of its surfaces reversibly changes from non-reflective to reflective. In contrast, a distinguishing attribute of the present invention regarding electro-optic modulators is a dynamic (non-permanent) reflective surface of an active material, where the surface reversibly changes from non-reflective to reflective. Moreover, when the active material is in the reflective state, the surface is reflective for a wavelength band more than 10 nm in width, and typically hundreds of nm in width. Further, the active material does not move when reversibly switching between the non-reflective and reflective states.

We introduce the term "electro-reflective optical modulator" to refer to an electro-optic modulator that contains an active material with the property that one or more of its surfaces reversibly changes from non-reflective-to-reflective and in correspondence with the input electronic signal that encodes the binary information.

Thus, one aspect of this invention pertains to an electro-optic modulator comprising an active material having a first state of transparency and of low reflectivity for one or more wavelengths and a second state of high reflectivity at the one or more wavelengths, wherein the active material reversibly switches between the first and second states. In one embodiment of the electro-optic modulator of this invention, the active material reversibly switches between the first and second states in correspondence with an input electronic signal that encodes binary information. In one embodiment, the active material reversibly switches between the first and second states by the injection and removal of electrons. In one embodiment, the active material switches from the first state to the second state by the removal of electrons, and switches from the second state to the first state by the injection of electrons. In one embodiment, the active material is reversibly switched between the first and second states by the application of an electric current. In one embodiment, the active material is reversibly switched between the first and second states by the variation of an applied voltage.

In one embodiment of the electro-optic modulator, the active material does not absorb at the one or more wavelengths in the first and the second states. In one embodiment, the modulator comprises a reflective stack comprising (a) two or more active layers comprising the active material having the first and second states and (b) one or more non-reflective and transmissive layers interposed between each of the two or more active layers. In one embodiment, the one or more wavelengths is in the infrared spectrum. In one embodiment, the one or more wavelengths is from 1250 nm to 1750 nm. In one embodiment, the active material when it is in the second state of high reflectivity is reflective for a wavelength band at least 10 nm in width such that the one or more wavelengths comprises a wavelength band at least 10 nm wide. In one embodiment, the active material when it is in the second state of high reflectivity is reflective for a wavelength band at least 100 nm in width. In one embodiment, the active material when it is in the second state of high reflectivity is reflective for a wavelength band at least 1000 nm in width.

In one embodiment, the electro-optic modulator is solid state and has no moving parts, wherein the active material does not move when reversibly switched between the first and second states. In one embodiment, a reflective surface of the second state of the active material is at from 0° to 90° with respect to an input optical signal. In one embodiment, the first state of transparency and of low reflectivity corresponds to the binary information of a logical 1, and the second state of high reflectivity corresponds to the binary information of a logical 0. In one embodiment, the first state of transparency and of low reflectivity corresponds to the binary information of a logical 0, and the second state of high reflectivity corresponds to the binary information of a logical 1.

In one embodiment of the electro-optic modulator, the active material is an organic compound. In one embodiment, the active material in one or both of the first and second states is an organic free radical compound. In one embodiment, the active material in one or both of the first and second states is a salt of an organic free radical cation. In one embodiment, the active material in one or both of the first and second states is a salt of a non-polymeric organic free radical cation. In one embodiment, the active material in one or both of the first and second states is a salt of an aminium radical cation.

Still another aspect of this invention pertains to an electro-optic modulator comprising an active material having a first state of transparency and of low reflectivity for one or more wavelengths and a second state of high reflectivity at the one or more wavelengths, wherein the active material reversibly switches between the first and second states, wherein the optical modulator is solid state and has no moving parts, and wherein the active material does not move when reversibly switched between the first and second states.

Methods of Switching and Modulating Optical Signals

As described herein, the optical shutters and switch devices of the present invention provide a variety of methods for switching an optical signal from an optical input path to a selected optical output path. Also, as described herein, the optical shutters and modulators of this invention provide a variety of methods for modulating an optical signal from an optical input path to an optical output path.

One aspect of this invention pertains to a method for switching an optical signal from one optical input path to a predetermined one of a plurality of different optical output paths, which method comprises the steps of (a) providing a free-space optical switch device, comprising an optical shutter disposed between an optical input path and a first and second optical output paths, the optical shutter being switchable between a transparent state in which the light from the input path is transmitted through the optical shutter to the first output path, and a reflective state in which the light from the input path is reflected from the optical shutter to the second output path; (b) inputting an optical signal into the input path; and (c) providing photons to switch the optical shutter reversibly between the transparent state and the reflective state in order to selectively direct the optical signal to a predetermined one of the output paths. In one embodiment, instead of photons, step (c) provides electrons from the flow of an electric current at a first voltage and removes electrons from the flow of an electric current at a second voltage to switch the optical shutter reversibly between the transparent state and the reflective state in order to selectively direct the optical signal to a predetermined one of the output paths. In one embodiment, the optical shutter comprises a first surface layer in a transparent state, a second surface layer in a transparent state, and a photon-absorbing layer in a transparent state and interposed between the first and second surface layers. In one embodiment, the optical shutter absorbs photons to change at least one of the first and second surface layers to a state of high reflectivity and to change the photon-absorbing layer to a state of opacity; and wherein the optical shutter is reversibly imageable between the transparent and reflective states. In one embodiment, the optical shutter removes electrons from the flow of an electric current at a voltage to change at least one of the first and second surface layers to a state of high reflectivity and to change the photon-absorbing layer to a state of opacity; and wherein the optical shutter is reversibly imageable between the transparent and reflective states. In one embodiment, the reverse imaging from the reflective state to the non-reflective and transparent state of the optical shutter is induced by providing electrons from the flow of an electric current at a voltage. In one embodiment, the photon-absorbing layer comprises an organic free radical compound in at least one of the first and second states. In one embodiment, at least one of the first and second surface layers comprises an organic free radical compound.

Another aspect of this invention pertains to a method for switching an optical signal from one optical input path to a predetermined one of a plurality of different optical output paths, which method comprises the steps of (a) providing a optical switch device, comprising an optical shutter disposed between an optical input port in a first input waveguide and both a first optical output port in a first waveguide and a second optical output port in a second output waveguide, the optical shutter being switchable between a transparent state in which the light from the input port is transmitted through the optical shutter to the first output port, and a reflective state in which the light from the input port is reflected from the optical shutter to the second output port; (b) inputting an optical signal into the input port; and (c) providing photons to switch the optical shutter reversibly between the transparent state and the reflective state in order to selectively direct the optical signal to a predetermined one of the output ports. In one embodiment, the optical shutter comprises a first surface layer in a transparent state, a second surface layer in a transparent state, and a photon-absorbing layer in a transparent state and interposed between the first and second surface layers. In one embodiment, the optical shutter is characterized by the absorption of photons to change at least one of the first and second surface layers to a state of high reflectivity and to change the photon-absorbing layer to a state of opacity; and wherein the optical shutter is characterized by being reversibly imageable between the transparent and reflective states. In one embodiment, the photon-absorbing layer comprises an organic free radical compound in at least one of first and second states.

Another aspect of the present invention pertains to a method for switching an optical signal from one or more optical input paths to a predetermined one of two or more optical output paths, which method comprises the steps of (a) providing an optical switch device, comprising an optical shutter disposed between the one or more optical input paths and the two or more optical output paths; (b) inputting an optical signal into the one or more input paths; and (c) providing photons to switch the optical shutter from the first state and the second state in order to selectively direct the optical signal to a predetermined one of the two or more output paths. In one embodiment, instead of photons, step (c) provides electrons from the flow of an electric current at a first voltage and removes electrons from the flow of an electric current at a second voltage to switch the optical shutter from the first state and the second state in order to selectively direct the optical signal to a predetermined one of the two or more output paths.

Thus, one aspect of this invention pertains to a method of modulating an optical signal at one or more wavelengths, wherein the method comprises the steps of (a) providing an input optical path; (b) providing an output optical path; (c) interposing an optical modulator between the input and output optical paths, wherein the optical modulator comprises an active material having a first state of transparency and of low reflectivity at the one or more wavelengths and a second state of high reflectivity at the one or more wavelengths, and wherein the active material reversibly switches between the first and second states; (d) providing an optical signal in the input optical path: and (e) reversibly switching the active material between the first and second states to modulate the optical signal in the output optical path.

In one embodiment of the method of modulating an optical signal, the active material reversibly switches between the first and second states in correspondence with an input electronic signal that encodes binary information. In one embodiment, the reversible switching of the active material between the first and second states is induced by the injection and removal of electrons. In one embodiment, the active material switches from the first state to the second state by the removal of electrons, and switches from the second state to the first state by the injection of electrons. In one embodiment, the reversible switching of the active material between the first and second states is induced by the application of an electric current. In one embodiment, the active material is reversibly switched between the first and second states by the variation of an applied voltage.

In one embodiment of the method of modulating an optical signal, the active material does not absorb at the one or more wavelengths in the first and the second states. In one embodiment, the modulator comprises a reflective stack comprising (a) two or more active layers comprising the active material having the first and second states and (b) one or more non-reflective and transmissive layers interposed between each of the two or more active layers.

In one embodiment of the method of modulating an optical signal, the one or more wavelengths is in the infrared spectrum. In one embodiment, the one or more wavelengths is from 1250 nm to 1750 nm. In one embodiment, the active material when it is in the second state of high reflectivity is reflective for a wavelength band at least 10 nm in width such that the one or more wavelengths comprises a wavelength band of at least 10 nm wide. In one embodiment, the active material when it is in the second state of high reflectivity is reflective for a wavelength band at least 100 nm in width. In one embodiment, the active material when it is in the second state of high reflectivity is reflective for a wavelength band at least 1000 nm in width.

In one embodiment of the method of modulating an optical signal, the optical modulator is solid state and has no moving parts, wherein the active material does not move when reversibly switched between the first and second states. In one embodiment, a reflective surface of the second state of the active material is at an angle from 0° to 90° with respect to the input optical signal. In one embodiment, the first state of transparency and of low reflectivity corresponds to the binary information of a logical 1, and the second state of high reflectivity corresponds to the binary information of a logical 0. In one embodiment, the first state of transparency and of low reflectivity corresponds to the binary information of a logical 0, and the second state of high reflectivity corresponds to the binary information of a logical 1.

In one embodiment of the method of modulating an optical signal, the active material is an organic compound. In one embodiment, the active material in one or both of the first and second states is an organic free radical compound. In one embodiment, the active material in one or both of the first and second states is a salt of an organic free radical cation. In one embodiment, the active material in one or both of the first and second states is a salt of a non-polymeric organic free radical cation. In one embodiment, the active material in one or both of the first and second states is a salt of an aminium radical cation.

Optical Modulators and Other Optical Devices Utilizing Organic Free Radical Compounds Due to the excellent absorption, reflectance, ease of switching by a simple electron transfer reaction by either absorption of photons or by the flow of an electric current to provide electrons or take them away, and other properties of organic free radical compounds, a wide range of optical shutters, optical switch devices, and optical modulators may be made that comprise organic free radical compounds, as described herein. Because of the many strong properties of the organic free radical compounds, such as their opacity and reflectance in one state and their transparency and non-reflectance in a second state when their switching is induced by absorbing photons, by the flow of an electric current to provide electrons to and to take them away from free radical compounds and their electron transfer products, thermally, or by some other external energy source, there are many combinations of one or more organic free radical compounds in one or more layers, areas, or sections of optical devices that may be used to achieve the desired properties in a wide range of optical devices. This disclosure covers some specific and general embodiments and examples of the use of organic free radical materials to make optical shutters, optical switch devices, and optical modulators, but it will be apparent to one skilled in the art that a wide range of combinations, changes, and modifications can be made therein without departing from the spirit and scope thereof.

Preferred organic free radical compounds for the optical shutters, optical switch devices, optical modulators, and other optical devices of this invention are salts of aminium radical cations. More preferred organic free radical compounds for the optical shutters, optical switch devices, optical modulators, and other optical devices of this invention are non-polymeric organic free radical compounds, such as salts of non-polymeric aminium radical cations. Most preferred organic free radical compounds are salts of tris(4-dialkylaminophenyl)aminium radical cations and salts of tetrakis[4-(dialkylamino)phenyl]-4-benzenediamine radical cations.

Chart 1 shows the chemical structure of a representative free radical compound for the reflective switch elements of this invention. This is an example of a salt of a tris(4-dialkylaminophenyl)aminium radical cation.

It can be seen in Chart 1 that the organic compound is a free radical with a single free electron shown on one of the nitrogen atoms. It is present in a salt form with a hexafluoroantimonate anion in this case. The aminium radical cation in Chart 1 has excellent absorption and reflectance properties for a reflective optical switch layer, such as, for example, in a 100 nm thick layer of 100% aminium compound on polyester (PET) film, with no significant absorption above 1250 nm while having a reflectance in the range of 5 to 20% over the 1250 to 1700 nm region for a single reflective optical switch layer. Multiple reflective switch layers comprising the organic free radical compounds with layers that are non-reflective interposed between the reflective, organic free radical-containing layers, may be utilized to increase the amount of reflectance to 80% and higher by forming a reflective stack comprised of multiple layers comprising reflective free radical compounds.

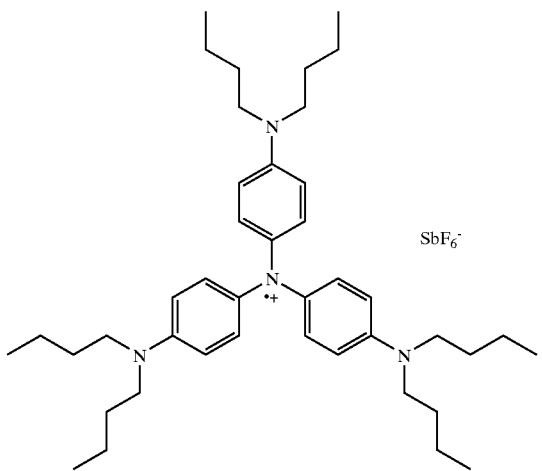

Near-Infrared Absorber for Reflective Optical Switch

The optical devices of this invention reversibly switch to a transparent and non-reflective state by either a photon-induced or an electrically-induced addition of one or more electrons, i.e., by an electron transfer reaction. Thus, these optical devices have the flexibility of being driven by either photons from a light source or by electrical drivers, as is known in the art of optical devices. Chart 2 shows the chemical structure of the leuco or transparent amine formed by one electron "bleaching" of the aminium-type near-infrared absorber for a reflective optical switch element, as shown in Chart 1.

It can be seen by comparing Charts 1 and 2 that the switching from the reflective, infrared-absorbing aminium radical cation of Chart 1 to the non-reflective, non-infraredabsorbing amine compound of Chart 2 occurs with the addition of a single electron and that the reversal of this process by taking away a single electron in an one-electron oxidation will convert the amine of Chart 2 back to the aminium radical cation of Chart 1.

Chart 2

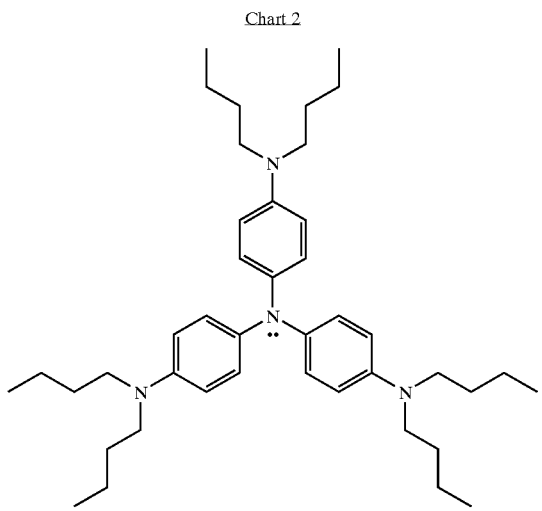

Transparent Amine from "Bleaching" of Near-IR Absorber for Reflective Optical Switch Thus, in basic terms, in the optical devices of this invention only electrons need to move. The optical devices of this invention are solid state devices with no moving parts, unless optional moving parts are desired for some reason. Also, since the switching of the organic free radical compounds, such as aminium free radical compounds, involves only the addition or removal of electrons and can be induced with photons as well as by the flow of an electric current, the wide variety of processes for reversibly imaging the optical devices utilized these optical shutters or switches of this invention is evident. These include, but are not limited to, reversible switching by photons, preferably photons of different wavelengths for each direction (reduction or oxidation) of switching; photons to switch in one direction and a thermal or "dark" reaction to switch back in the other direction; and by the addition and removal of electrons by the flow of an electric current at an appropriate voltage through the switch.

Since the absorption of photons by the free radical compounds, such as, for example, by aminium compounds, may result in a photon-induced electron transfer reaction, optical devices comprising organic free radical compounds may also be utilized in many other applications where a photo-induced flow of electrons is critical. Examples of these other applications include, but are not limited to, photodetectors to convert an incoming optical signal into an electrical signal, for example, either to measure the intensity of the optical signal or to do an optical-to-electrical conversion, as known in the art of fiber optic communication systems; and solar cells where the incident sunlight is converted into an electrical current, as known in the art of photovoltaic solar cells. For solar cells, organic free radical compounds, such as salts of aminium radical cations, are advantageous for their intense absorption of sunlight above 800 nm and out to over 2000 nm. These are infrared wavelength regions where conventional inorganic photovoltaics since as silicon solar cells are very inefficient at collecting the incident solar radiation. For solar cells, the organic free radical compounds may be used in combination with other organic free radical compounds and/or with inorganic and other known photovoltaics to achieve the optimum efficiency of solar energy conversion. For example, a layer comprising an organic free radical compound may be deposited over a layer of an inorganic photovoltaic material to provide a solar cell with increased efficiency and durability, since the organic free radical compounds, such as the salts of aminium radical cations, may be utilized as stabilizing materials, such as is known in the art of optical disks such as DVD disks.

Also, the photo-induced electron transfer reactions of organic free radical compounds, such as, for example, salts of aminium compounds, may be utilized for dye-sensitized splitting of water, as known in the art of solar energy conversion. The extended absorption range of the organic free radical compounds in the near-infrared range that is useful in solar cells is also useful for this aspect of solar energy conversion by splitting water to hydrogen and oxygen. The organic free radical compounds may be utilized alone or in combination with other organic free radical compounds or other non-free radical dyes to sensitize the splitting of water, especially to provide efficient absorption of the solar radiation in the visible region where many of the organic free radical compounds do not have the broad, intense absorptions that they have in the near-infrared and ultraviolet wavelength regions. One aspect of this involves complexing of the sensitizing dye to an inorganic oxide layer such as a titanium oxide sol gel, where sub-picosecond photo-induced electron transfer reations have been observed with certain non-free radical sensitizing dyes. Since the inorganic oxide layers are typically positively charged, radical anion compounds will complex readily, but typically the radical cation compounds can only be complexed by first complexing an anionic compound with excess anionic groups to the inorganic oxide layer and then complexing the positively charged radical cation compounds to the excess anionic groups.

Also, since organic free radical compounds, such as, for example, salts of aminium radical cations, may be converted from one distinct state to another by the addition or removal of an electron, they may be utilized in electrical devices where electrons are stored and then removed. Preferred organic free radical compounds in such electrical devices are non-polymeric organic free radical compounds which are monomeric with no repeating moiety in their chemical structure, such as for example salts of aminium radical cations such as, for example, IR-99 and IR-126. Besides providing a stable material in which to add or remove an electron, many of the organic free radical compounds, particularly the anion radical salts and cation radical salts, are electrically conductive in the free radical state and are non-conductive when reversibly converted to a non-conductive state. Also, the voltages and current required to electrically induce switching in the organic free radical compounds is typically very low, such as 1 to 2 volts or less at a low current. Thus, electrical devices comprising organic free radical compounds, particularly comprising salts of aminium compounds, may be utilized in a variety of electrical devices including, but not limited to, single electron transistors, as known in the art of transistors. Due to the ability of the organic free radical compounds to generally operate effectively in submicron sizes, they are useful for quantum well, quantum dot, and quantum wire configurations for single electron transistors and other electrical devices and connections.

A particularly advantageous aspect of this invention is the unique reflective switching properties of optical shutters and other optical devices comprising organic free radical compounds, particularly salts of aminium radical cations, and most particularly when the organic free radical compounds are reflective in a range of near-infrared wavelengths, but are not significantly absorptive or have no absorption in this same range of near-infrared wavelengths, as, for example, described herein in the case of IR-99. Beside its advantageous use in a wide variety of optical switch devices, the reflective optical switches comprising organic free radical compounds of the present invention are suitable for optical devices for demultiplexing and multiplexing optical signals where the different path lengths of the different wavelengths through a reflective stack with multiple individual reflective switch layers of the unique type of this invention that comprise reflective organic free radical compounds, in contrast to a reflective stack based on alternating layers of specific thicknesses and differences in index of refraction, as known in the art of mirrors. In addition, the reflective stack of this invention and the optical devices based on these reflective stacks are dynamic and are reversibly switchable from an "on" state to and "off" state, in contrast to the passive nature of conventional reflective stack such as those that utilize index of refraction effects. Besides optical devices for demultiplexing and multiplexing, the reflective stacks of the reflective optical shutters and switch devices of this invention, may be utilized for interference filters where, after demultiplexing which puts each wavelength in a unique position apart from the other wavelengths, an optical switch may be utilized for each wavelength to drop it, if desired, by switching it to a desired output path or, if desired, to discard it by using an absorptive optical shutter of this invention. Similarly, in a multiplexing mode, the reflective stacks of the reflective optical shutters of this invention may be utilized to add one or more wavelengths.

One particularly unique aspect of the optical shutters, optical switch devices, and optical modulators of this invention are the transparent non-reflective-to-reflective optical shutters, optical switch devices, and optical modulators comprising a reflective organic free radical compound, most particularly when the reflective organic free radical compound has no absorption at the wavelengths where the reflective switching occurs. These unique properties of reflecting optical signals while having no absorption of the optical signals are particularly useful for avoiding degradation by absorption of photons by the optical device, for minimizing the insertion loss of the optical signal being switched or transmitted, and for maximizing the contrast ratio of the output signal between the "switched" and "non-switched" states. Besides the solid state, "no moving parts" aspect of the optical shutters, optical switch devices, and optical modulators of this invention in contrast to the moving nature of other reflective optical switches such as, for example, those based on microelectromechanical system (MEMS) devices, these optical devices comprising reflective organic free radical compounds of this invention are unique and useful in involving actually reflective material to reflect in a passive function and to also switch in a dynamic reflective mode, in contrast to the use of multiple layers of materials of differing indices of refraction to provide reflection or mirror-like properties in a passive form or dynamically if a mechanical motion of the layers is induced.

Thus, the optical shutters and optical devices of this invention comprising a reflective organic free radical compound provide unique classes of passive and dynamic reflective optical shutters and devices. For example, other applications for the unique reflective materials, electro-reflective modulators, and other optical devices of this invention include, but are not limited to, optical demultiplexing and multiplexing devices, and optical projection devices for computer, movie, high definition television (HDTV), and other digital projection devices.

For example, the unique multiple reflective layer or reflective stack configurations of the optical shutters and optical switch devices of this invention are adapted for use in providing a demultiplexing and a multiplexing optical component where individual wavelengths travel different distances through the optical component comprising a reflective stack that comprises a reflective material, such as an organic free radical compound, and, with the optional use of a lens, may then arrive at a certain plane of the optical waveguide or other optical transmission matrix with each specific wavelength at a different two-dimensional position and thus available to be coupled into a specific output path in the case of demultiplexing. Conversely, when the optical signals are demultiplexed and have a different two-dimensional position in a certain plane of the optical waveguide or other optical transmission matrix, the optical signals may be multiplexed by passing through the optical stack comprising a reflective stack of multiple layers of a reflective material of this invention. Since the optical shutters and optical devices comprising a reflective stack of the present invention may be reversibly switched from non-reflective and transmissive to reflective at a variety of wavelengths, optical demultiplexing and multiplexing devices based on such reflective stacks would be unique in being dynamic and capable of being switched from demultiplexing and/or multiplexing in the reflective state to be transmissive in the non-reflective and transmissive state. This feature could be utilized in transmitting or switching the optical signal to another output path that is different from the output path from demultiplexing or multiplexing.

While the invention has been described in detail and with reference to specific and general embodiments thereof, it will be apparent to one skilled in the art that various changes and modifications can be made therein without departing from the spirit and scope thereof.

What is claimed is:

1. An electro-optic modulator comprising an active material having a first state of transparency and of low reflectivity for one or more wavelengths and a second state of high reflectivity at said one or more wavelengths, wherein said active material reversibly switches between said first and second states by the injection and removal of electrons from said active material by the application of an electric current, and wherein said active material in one or both of said first and second states is a salt of an organic free radical cation, wherein said injection and removal of electrons chances the reflectivity of said salt of said organic free radical cation.

2. The electro-optic modulator of claim 1, wherein said active material reversibly switches between said first and second states in correspondence with an input electronic signal that encodes binary information.

3. The electro-optic modulator of claim 1, wherein said active material switches from said first state to said second state by the removal of electrons, and switches from said second state to said first state by the injection of electrons.

4. The electro-optic modulator of claim 1, wherein said active material is reversibly switched between said first and second states by the variation of an applied voltage.

5. The electro-optic modulator of claim 1, wherein said active material does not absorb at said one or more wavelengths in said first and said second states.

6. The electro-optic modulator of claim 1, wherein said modulator comprises a reflective stack comprising:
   (a) two or more active layers comprising said active material having said first and second states and
   (b) one or more non-reflective and transmissive layers interposed between each of said two or more active layers.

7. The electro-optic modulator of claim 1, wherein said one or more wavelengths is in the infrared spectrum.

8. The electro-optic modulator of claim 1, wherein said one or more wavelengths is from 1250 nm to 1750 nm.

9. The electro-optic modulator of claim 1, wherein said one or more wavelengths comprises a wavelength band at least 10 nm in width.

10. The electro-optic modulator of claim 1, wherein said one or more wavelengths comprises a wavelength band at least 100 nm in width.

11. The electro-optic modulator of claim 1, wherein said one or more wavelengths comprises a wavelength band at least 1000 nm in width.

12. The electro-optic modulator of claim 1, wherein a reflective surface of said second state of said active material is at from 0° to 90° with respect to an input optical signal.

13. The electro-optic modulator of claim 1, wherein a reflective surface of said second state of said active material is at a 45° angle with respect to an input optical signal.

14. The electro-optic modulator of claim 1, wherein a reflective surface of said second state of said active material is at a 90° angle with respect to an input optical signal.

15. The electro-optic modulator of claim 1, wherein said first state of transparency and of low reflectivity corresponds to the binary information of a logical 1, and said second state of high reflectivity corresponds to the binary information of a logical 0.

16. The electro-optic modulator of claim 1, wherein said first state of transparency and of low reflectivity corresponds to the binary information of a logical 0, and said second state of high reflectivity corresponds to the binary information of a logical 1.

17. The electro-optic modulator of claim 1, wherein said active material in one or both of said first and second states is a salt of a non-polymeric organic free radical cation.

18. The electro-optic modulator of claim 1, wherein said salt of an organic free radical cation is a salt of an aminium radical cation.

19. A method of modulating an optical signal at one or more wavelengths, wherein said method comprises the steps of:
   (a) providing an input optical path;
   (b) providing an output optical path;
   (c) interposing an electro-optic modulator between said input and output optical paths, wherein said modulator comprises an active material having a first state of transparency and of low reflectivity at said one or more wavelengths and a second state of high reflectivity at said one or more wavelengths, and wherein said active material reversibly switches between said first and second states by the injection and removal of electrons from said active material by the application of an electric current, and wherein said active material in one or both of said first and second states is a salt of an organic free radical cation, wherein said injection and removal of electrons changes the reflectivity of said salt of said organic free radical cation;
   (d) providing an optical signal in said input optical path; and
   (e) reversibly switching said active material between said first and second states to modulate said optical signal in said output optical path.

20. The method of claim 19, wherein said active material reversibly switches between said first and second states in correspondence with an input electronic signal that encodes binary information.

21. The method of claim 19, wherein said active material switches from said first state to said second state by the removal of electrons, and switches from said second state to said first state by the injection of electrons.

22. The method of claim 19, wherein said active material is reversibly switched between said first and second states by the variation of an applied voltage.

23. The method of claim 19, wherein said active material does not absorb at said one or more wavelengths in said first and said second states.

24. The method of claim 19, wherein said modulator comprises a reflective stack comprising:
   (a) two or more active layers comprising said active material having said first and second states and
   (b) one or more non-reflective and transmissive layers interposed between each of said two or more active layers.

25. The method of claim 19, wherein said one or more wavelengths is in the infrared spectrum.

26. The method of claim 19, wherein said one or more wavelengths is from 1250 nm to 1750 nm.

27. The method of claim 19, wherein said one or more wavelengths comprises a wavelength band at least 10 nm in width.

28. The method of claim 19, wherein said one or more wavelengths comprises a wavelength band at least 100 mm in width.

29. The method of claim 19, wherein said one or more wavelengths comprises a wavelength band at least 1000 nm in width.

30. The method of claim 19, wherein a reflective surface of said second state of said active material is at an angle from 0° to 90° with respect to said input optical signal.

31. The method of claim 19, wherein a reflective surface of said second state of said active material is at a 45° angle with respect to said input optical signal.

32. The method of claim 19, wherein a reflective surface of said second state of said active material is at a 90° angle with respect to said input optical signal.

33. The method of claim 19, wherein said first state of transparency and of low reflectivity corresponds to the binary information of a logical 1, and said second state of high reflectivity corresponds to the binary information of a logical 0.

34. The method of claim 19, wherein said first state of transparency and of low reflectivity corresponds to the binary information of a logical 0, and said second state of high reflectivity corresponds to the binary information of a logical 1.

35. The method of claim 19, wherein said active material in one or both of said first and second states is a salt of a non-polymeric organic free radical cation.

36. The method of claim 19, wherein said salt of an organic free radical cation is a salt of an aminium radical cation.

* * * * *